US011659457B2

United States Patent
Axmon et al.

(10) Patent No.: US 11,659,457 B2
(45) Date of Patent: *May 23, 2023

(54) DETERMINING MEASUREMENT PERIOD SCALING FOR MEASUREMENT GAPS IN 5G/NR

(71) Applicant: Telefonaktiebolaget LM Ericsson (publ), Stockholm (SE)

(72) Inventors: Joakim Axmon, Limhamn (SE); Christopher Callender, Kinross (GB); Muhammad Kazmi, Sundbyberg (SE); Iana Siomina, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 188 days.

This patent is subject to a terminal disclaimer.

(21) Appl. No.: 16/976,507

(22) PCT Filed: Apr. 4, 2019

(86) PCT No.: PCT/EP2019/058572
§ 371 (c)(1),
(2) Date: Aug. 28, 2020

(87) PCT Pub. No.: WO2019/193128
PCT Pub. Date: Oct. 10, 2019

(65) Prior Publication Data
US 2021/0014752 A1    Jan. 14, 2021

Related U.S. Application Data

(60) Provisional application No. 62/653,004, filed on Apr. 5, 2018.

(51) Int. Cl.
*H04W 36/00* (2009.01)
*H04W 24/10* (2009.01)
(Continued)

(52) U.S. Cl.
CPC ....... *H04W 36/0088* (2013.01); *H04W 24/10* (2013.01); *H04W 36/0094* (2013.01);
(Continued)

(58) Field of Classification Search
CPC ............. H04W 24/10; H04W 36/0088; H04W 36/00837; H04W 36/0094; H04W 36/165;
(Continued)

(56) References Cited

U.S. PATENT DOCUMENTS

2015/0289141 A1* 10/2015 Ghasemzadeh ....... H04W 16/14
370/330
2019/0306734 A1* 10/2019 Huang .................. H04L 5/0092

FOREIGN PATENT DOCUMENTS

WO    2017203487 A1    11/2017

OTHER PUBLICATIONS

"3GPP TS 36.133 V14.6.0", 3rd Generation Partnership Project; Technical Specification Group Radio Access Network; Evolved Universal Terrestrial Radio Access (E-UTRA); Requirements for support of radio resource management (Release 14), Dec. 2017, pp. 1-641.

(Continued)

*Primary Examiner* — Margaret G Mastrodonato
(74) *Attorney, Agent, or Firm* — Christopher & Weisberg, P.A.

(57) ABSTRACT

Embodiments includes methods performed by a user equipment, LT, to schedule a plurality of mutually-exclusive repetitive measurement activities in a wireless network. Such embodiments include receiving, from a network node serving the UE, a measurement configuration comprising: least one measurement timing configuration for each of a plurality of mutually exclusive repetitive measurement activities; and identification of a measurement gap pattern for performing the measurement activities. Such embodi- (Continued)

ments also include selecting an analysis period for a measurement schedule, and determining, over the analysis period, measurement load information related to the measurement configuration. Such embodiments also include determining, based on the measurement load information, a measurement time scaling factor and a scaled measurement time for each measurement activity. Some embodiments include determining a measurement schedule and/or performing measurements based on the scaled measurement time. Embodiments also include methods performed by network nodes, and UEs and network nodes configured to perform such methods.

25 Claims, 6 Drawing Sheets

(51) Int. Cl.
    *H04W 36/16*     (2009.01)
    *H04W 36/26*     (2009.01)
(52) U.S. Cl.
    CPC ............... *H04W 36/00837* (2018.08); *H04W 36/165* (2013.01); *H04W 36/26* (2013.01)
(58) Field of Classification Search
    CPC ............. H04W 36/26; H04W 36/0058; H04W 24/08
    See application file for complete search history.

(56) References Cited

OTHER PUBLICATIONS

"3GPP TS 36.211 V14.5.0", 3rd Generation Partnership Project; Technical Specification Group Radio Access Network; Evolved Universal Terrestrial Radio Access (E-UTRA); Physical channels and modulation (Release 14), Dec. 2017, pp. 1-197.

"3GPP TS 38.133 V15.4.0", 3rd Generation Partnership Project; Technical Specification Group Radio Access Network; NR; Requirements for support of radio resource management (Release 15), Dec. 2018, pp. 1-862.

"Remaining issues on intra frequency measurement requirements with measurement gap", 3GPP TSG RAN WG4 Meeting #86; R4-1802537; Athens, Greece, Feb. 26-Mar. 2, 2018, pp. 1-5.

"Remaining issues on Radio link monitoring based on SSB", 3GPP TSG RAN WG4 Meeting #86; R4-1802538; Athens, Greece, Feb. 26-Mar. 2, 2018, pp. 1-5.

"Way forward on SSB-based inter-frequency measurement requirements", 3GPP TSG-RAN WG4 Meeting #86 R4-1803507; Athens, Greece, Feb. 26-Mar. 2, 2018, pp. 1-2.

"3GPP Ts 36.331 V15.0.1", 3rd Generation Partnership Project; Technical Specification Group Radio Access Network Evolved Universal Terrestrial Radio Access (E-UTRA); Radio Resource Control (RRC); Protocol specification (Release 15), Jan. 2018, pp. 1-776.

"3GPP Ts 38.211 V15.0.0", 3rd Generation Partnership Project; Technical Specification Group Radio Access Network; NR; Physical channels and modulation (Release 15), Dec. 2017, pp. 1-73.

"3GPP TS 38.215 V15.0.0", 3rd Generation Partnership Project; Technical Specification Group Radio Access Network; NR; Physical layer measurements (Release 15), Dec. 2017, pp. 1-13.

"3GPP TS 38.331 V15.1.0", 3rd Generation Partnership Project; Technical Specification Group Radio Access Network; NR; Radio Resource Control (RRC) protocol specification (Release 15), Mar. 2018, pp. 1-268.

"3GPP TS 38.133 V15.0.0", 3rd Generation Partnership Project; Technical Specification Group Radio Access Network; NR; Requirements for support of radio resource management (Release 15), Dec. 2017, pp. 1-41.

"3GPP TS 36.214 V15.0.1", 3rd Generation Partnership Project; Technical Specification Group Radio Access Network; Evolved Universal Terrestrial Radio Access (E-UTRA); Physical layer; Measurements (Release 15), Jan. 2018, pp. 1-9.

"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.

"Further aspects of measurement gap design for NR. Multiple layers", 3GPP TSG-RAN WG4 Meeting #86bis, R4-103787, Melbourne, Australia, Mar. 16-20, 2018, pp. 1-13.

\* cited by examiner

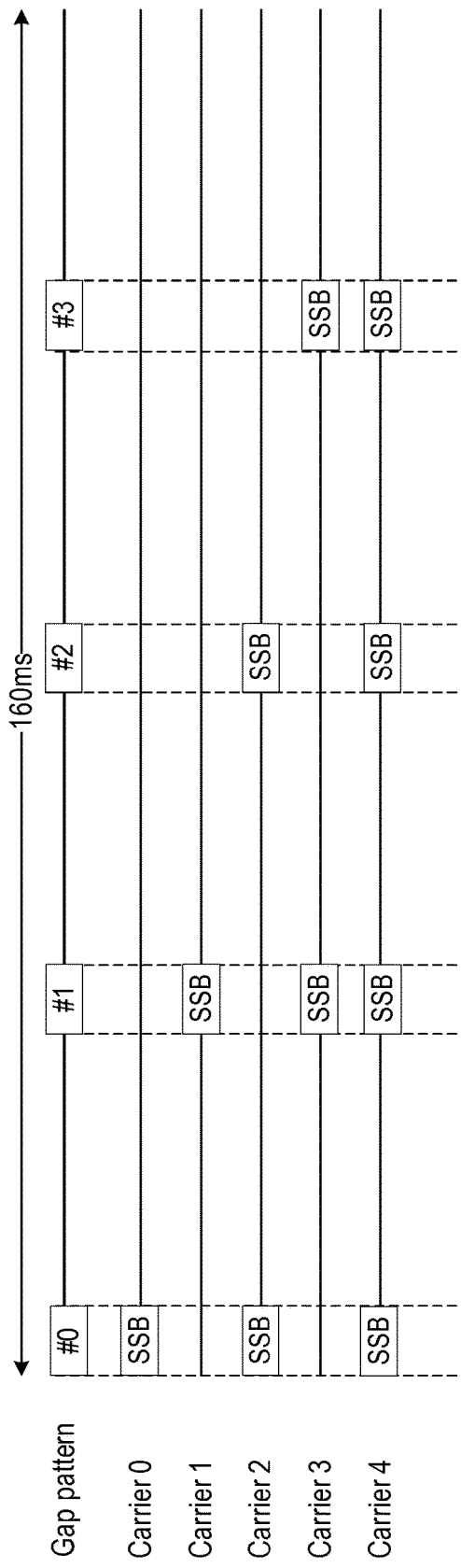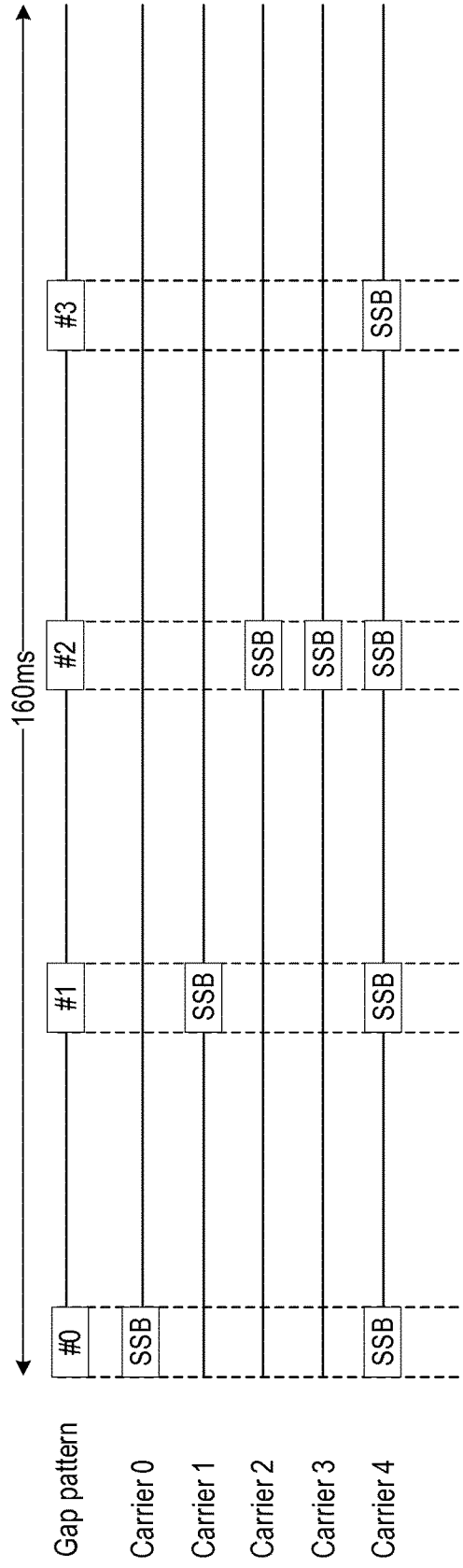
FIG. 3
FIG. 4

DETERMINING MEASUREMENT PERIOD SCALING FOR MEASUREMENT GAPS IN 5G/NR

TECHNICAL FIELD

The present application relates generally to the field of wireless communication systems and methods, and more specifically to devices, methods, and computer-readable media that improve measurement scheduling by a device or user equipment (UE) operating in a wireless communication network.

BACKGROUND

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands, including the 700-MHz band in the United States. LTE is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

In addition, LTE Rel-10 (Rel-10) supports bandwidths larger than 20 MHz. One important requirement on Rel-10 is to assure backward compatibility with LTE Release-8. This should also include spectrum compatibility. As such, a wideband LTE Rel-10 carrier (e.g., wider than 20 MHz) should appear as a number of carriers to an LTE Rel-8 terminal. Each such carrier can be referred to as a Component Carrier (CC). In particular, for early LTE Rel-10 deployments it can be expected that there will be a smaller number of LTE Rel-10-capable terminals compared to many LTE legacy terminals. For an efficient use of a wide carrier also for legacy terminals, legacy terminals can be scheduled in all parts of the wideband LTE Rel-10 carrier. One exemplary way to achieve this is by means of Carrier Aggregation (CA), whereby an LTE Rel-10 terminal can receive multiple CCs, each preferably having the same structure as a Rel-8 carrier.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher.

Furthermore, multi-RAT (radio access technology) dual connectivity (MR-DC) can also be envisioned as an important feature in 5G RAN architectures to deliver enhanced end-user bit rate. One such MR-DC arrangement is commonly referred to as E-UTRAN-NR Dual Connectivity (or EN-DC for short) and identified in 3GPP TR 38.801 as "option 3." In EN-DC, a node providing E-UTRA resources (e.g., LTE eNB) acts as master node (MN, i.e., anchors the UE control-plane connection) and an NR node (e.g., gNB) acts as secondary node (SN) providing additional UP resources.

A UE can perform periodic cell search and measurements of signal power and quality (e.g., reference signal received power, RSRP, and Reference signal received quality, RSRQ) in both Connected and Idle modes. The UE is responsible for detecting new neighbor cells, and for tracking and monitoring already detected cells. The detected cells and the associated measurement values are reported to the network. An LTE UE can perform such measurements on various downlink reference signals (RS) including, e.g., cell-specific Reference Signal (CRS), MBSFN reference signals, UE-specific Reference Signal (DM-RS) associated with PDSCH, Demodulation Reference Signal (DM-RS) associated with EPDCCH or MPDCCH, Positioning Reference Signal (PRS), and CSI Reference Signal (CSI-RS)

UE measurement reports to the network can be configured to be periodic or aperiodic based a particular event. For example, the network can configure a UE to perform measurements on various carrier frequencies and various RATs corresponding to neighbor cells, as well as for various purposes including, e.g., mobility and positioning. The configuration for each of these measurements is referred to as a "measurement object." Furthermore, the UE can be configured to perform the measurements according to a "measurement gap pattern" (or "gap pattern" for short), which can comprise a measurement gap repetition period (MGRP) (i.e., how often a regular gap available for measurements occurs) and a measurement gap length (MGL) (i.e., the length of each regularly-occurring gap).

SUMMARY

Accordingly, to address at least some of such issues and/or problems, certain exemplary embodiments of apparatus, devices, methods, and computer-readable media according to the present disclosure can improve measurement-related performance, thereby improving performance of both the UE and the network in scenarios involving multiple mutually-exclusive measurement requirements on a particular UE. Exemplary methods, systems, devices, and computer-readable media according to the present disclosure can improve delays (e.g., in cell identification for UE handover) in these scenarios by efficiently adapting to measurement requirements from the network.

One resulting exemplary benefit is that handover can be performed before serving cell quality becomes critically low. Another resulting exemplary benefit is that cell offloading can be performed before downlink buffers in the base station overrun. Another resulting exemplary benefit is reduced UE power consumption for measurements. Another resulting exemplary benefit is reducing and/or eliminating degradations to user experience, such as dropped data connections caused by delayed handover due to measurement delays.

Exemplary embodiments include methods and/or procedures for a user equipment (UE) to schedule a plurality of mutually-exclusive repetitive measurement activities in a wireless network. The exemplary methods and/or procedures can include receiving, from the serving network node, a measurement configuration comprising at least one measurement timing configuration (SMTC) for each of a plurality of mutually exclusive repetitive measurement activities (e.g., measurement objects), and identification of a measurement gap pattern for performing the plurality of measurement activities. The exemplary methods and/or procedures can also include selecting an analysis period for a measurement schedule, and determining, over the analysis period, measurement load information related to the measurement configuration.

The exemplary methods and/or procedures can also include determining, based on the measurement load information, a measurement time scaling factor and a scaled measurement time for each of the measurement activities. Furthermore, the exemplary methods and/or procedures can also include the UE scheduling measurements comprising the plurality of measurement activities based on at least one of the following derived from the respective scaled measurement times: a schedule and a constraint. In some embodiments, the exemplary methods and/or procedures can also include the UE performing the scheduled measurements comprising the mutually-exclusive measurement activities.

Other embodiments include exemplary methods and/or procedures performed by a network node, in a wireless communication network, to configure a user equipment (UE) to perform a plurality of mutually-exclusive repetitive measurement activities. The exemplary methods and/or procedures can include transmitting, to the UE, a measurement configuration comprising at least one measurement timing configuration (SMTC) for each of a plurality of mutually exclusive repetitive measurement activities (e.g., measurement objects), and identification of a measurement gap pattern for performing the plurality of measurement activities. The exemplary methods arid/or procedures can also include selecting an analysis period for a measurement schedule and determining, over the analysis period, measurement load information related to the measurement configuration.

The exemplary methods and/or procedures can also include determining, based on the measurement load information, a measurement time scaling factor and a scaled measurement time for each of the measurement activities. In some embodiments, the exemplary methods and/or procedures can include determining whether one or more of the scaled measurement times exceeds a threshold. The exemplary methods and/or procedures can also include determining an updated measurement configuration, for the UE, based on the respective scaled measurement times for the plurality of measurement activities. In some embodiments, the exemplary methods and/or procedures can also include the network node transmitting the updated measurement configuration to the UE. In some embodiments, determining and transmitting the updated measurement configuration can be based on a positive result of the threshold determination.

Other exemplary embodiments include user equipment (UE) configured to perform operations corresponding to the exemplary methods and/or procedures described above. Other exemplary embodiments include non-transitory, computer-readable media storing program instructions that, when executed by at least one processor, configure user equipment to perform operations corresponding to the exemplary methods and/or procedures described above.

Other exemplary embodiments include user equipment (UEs, e.g., wireless device, or component thereof such as a modem) and network nodes (e.g., eNB, gNB, ng-eNB, en-gNB, base station, etc., or component thereof) configured to perform operations corresponding to various exemplary methods and/or procedures described herein. Other exemplary embodiments include non-transitory, computer-readable media storing program instructions that, when executed by at least one processor, configure a UE or a network node to perform operations corresponding to various exemplary methods and/or procedures described above.

These and other objects, features and advantages of the exemplary embodiments of the present disclosure will become apparent upon reading the following detailed description of the exemplary embodiments of the present disclosure, when taken in conjunction with the appended exemplary embodiments.

BRIEF DESCRIPTION OF THE DRAWINGS

FIG. 3 is a timing diagram of an exemplary use case comprising five (5) measurement objects and four (4) measurement gaps, according to various exemplary embodiments of the present disclosure.

FIG. 4 is a timing diagram of another exemplary use case comprising five (5) measurement objects and four (4) measurement gaps, according to various exemplary embodiments of the present disclosure.

While the present disclosure will now be described in detail with reference to the figures, it is done so in connection with the illustrative embodiments and is not limited by the particular embodiments illustrated in the figure(s) or in the appended claims.

DETAILED DESCRIPTION

As briefly mentioned above, applying these LTE E-UTRAN measurement period scaling techniques to NR measurement scheduling would have a negative impact on UE mobility and inter-cell load balancing, which could result in degraded network capacity (e.g., number of users), data rates, coverage, and/or end user experience. This is discussed in more detail below.

In an LTE E-UTRAN, cell detection times and layer 1 (L1) measurement periods are scaled by a factor $N_{freq}$ specified as:

$$N_{freq}=N_{freq,E\text{-}UTRA}+N_{freq,UTRA}+M_{gsm}+N_{freq,cdma2000}+N_{freq,HRPD},$$

where $N_{freq,E\text{-}UTRA}$ is the number of inter-frequency FDD and/or TDD carriers, $N_{freq,UTRA}$ is the number of inter-RAT UTRA FDD (WCDMA) or TDD (TD-SCDMA/low chip rate (LCR) TDD) carriers, $M_{gsm}$ is the number of GSM layers (0-2 depending on number of GSM carriers and measurement gap configuration), $N_{freq,cdma}2000$ is the number of CDMA2000 1× carriers, and $N_{freq,HRPD}$ is the number of high-rate packet data service (HRPD) carriers being monitored by the UE.

Moreover, scaling of E-UTRAN inter-frequency cell detection time for an individual carrier can be expressed as:

$$T_{Identify\_Infer} = T_{Basic\_Identify\_Inter} \cdot \frac{480}{T_{Inter1}} \cdot N_{freq},$$

where $T_{Basic\_Identify\_Inter}$ is a reference cell detection time constant, $T_{Inter1}$ is a constant whose value is depending on the measurement gap configuration in use, and $N_{freq}$ is the scaling factor described above. Similarly, scaling of E-UTRA inter-frequency layer 1 (L1) measurement period (e.g., for RSRP and RSRQ) for an individual carrier is expressed as:

$$T_{Measurement\_Period\_Inter\_FDD}=480\times N_{freq}$$

where $N_{freq}$ is the scaling factor described above. Both expressions are in millisecond units.

Figure 1:
FIGS. 1a-1c show various exemplary time-frequency configurations of NR SS/PBCH blocks (SSBs).

In NR, downlink signals available for UE measurement can occur much more sparsely, or over a longer time period, than in LTE. An exemplary configuration for an NR synchronization signal and PBCH block (SSB) is illustrated in FIG. 1a. The NR SSB comprises a Primary Synchronization Signal (PSS), a Secondary Synchronization Signal (SSS), a Physical Broadcast Channel (PBCH), and Demodulation Reference Symbols (DM-RS). As also shown in FIG. 1a, an individual SSB spans four adjacent OFDM symbols within a PRB. Multiple SSBs comprise an SSB burst, which is transmitted within a half-frame (e.g., 5 ms). Moreover, within the half-frame, multiple SSBs for different cells or different beams may be transmitted, as illustrated with SSB indices 0-7 in FIG. 1b. The number of SSB locations in a burst depends on the frequency range (e.g., 0-3 or 0-6 GHz as shown in FIG. 1b), as well as on the particular NR radio interface configuration. The SSB burst (and, hence, the individual SSBs) are transmitted according to an SSB measurement timing configuration (SMTC) cycle, which may be 5, 10, 20, 40, 80 or 160 ms, as illustrated in FIG. 1c.

The UE is configured by the network node (e.g., base station, eNB, gNB, etc.) with an SMTC for each NR carrier to be measured. The SMTC can include information, e.g., on a period and an offset. The SMTC offset can be expressed as a number of subframes, each of length 1 ms, within the range 0 to SMTC period-1, and is using the frame border of system frame number 0 of the serving cell as reference.

The measurement gap patterns for EN-DC (also referred to as non-standalone (NSA) NR operation), in which the UE simultaneously is connected to an E-UTRA serving cell and a NR serving cell, are listed in Table 1, which is defined in 3GPP TS 38.133. As shown in Table 1, the periodicity of a gap pattern—measurement gap repetition period (MGRP)—is 20, 40, 80 or 160 ms, and the measurement gap length (MGL) is 1.5, 3, 3.5, 4, 5.5 or 6 ms.

TABLE 1

| Gap Pattern Id | Measurement Gap Length (MGL, ms) | Measurement Gap Repetition Period (MGRP, ms) |
| --- | --- | --- |
| 0 | 6 | 40 |
| 1 | 6 | 80 |
| 2 | 3 | 40 |
| 3 | 3 | 80 |
| FFS: [4] | [6] | [20] |
| [5] | 6 | 160 |
| FFS: [6] | [4] | [20] |
| [7] | 4 | 40 |
| [8] | 4 | 80 |
| [9] | [4] | [160] |
| [10] | 3 | 20 |
| [11] | 3 | 160 |
| FFS: [12] | [5.5] | [20] |
| [13] | [5.5] | 40 |
| [14] | [5.5] | 80 |
| [15] | [5.5] | 160 |
| [16] | [3.5] | 20 |
| [17] | [3.5] | 40 |
| [18] | [3.5] | 80 |
| [19] | [3.5] | 160 |
| [20] | [1.5] | 20 |
| [21] | [1.5] | 40 |
| [22] | [1.5] | 80 |
| [23] | [1.5] | [160] |

For NSA operation, the network can configure the UE according to two different options: 1) "per-UE gap", a single gap pattern to be used for all E-UTRA and NR inter-frequency measurements and/or NR intra-frequency measurements outside the active NR bandwidth part (BWP); or 2) "per-frequency range (FR) gaps" of two frequency-specific gap patterns, where one gap pattern applies to LTE and frequency range 1 (FR1) (e.g., below ~6 GHz) NR serving cells, and allows measurement of FR1 inter-frequency measurement objects, and the other gap pattern applies to frequency range 2 (FR2) (e.g., above ~24 GHz) NR serving cells and allows measurement of FR2 NR inter-frequency measurement and/or NR intra-frequency measurement outside the active BWP. It is a UE capability whether to support per-UE gaps or per-FR gaps, although UEs that support per-FR gaps can be configured with either per-UE or per-FR gaps. Table 2 below (also from 3GPP 38.133) shows the applicability of different gap patterns in Table 1 for NSA operation.

TABLE 2

| Measurement gap pattern configuration | Serving cell | Measurement Purpose | Applicable Gap Pattern Id |
| --- | --- | --- | --- |
| Per-UE measurement gap | E-UTRA + FR1, or E-UTRA + FR2, or E-UTRA + FR1 + FR2 | non-NR RAT [Note1] FR1 and/or FR2 non-NR | 0, 1, 2, 3 0-11 0, 1, 2, 3 |

TABLE 2-continued

| Measurement gap pattern configuration | Serving cell | Measurement Purpose | Applicable Gap Pattern Id |
|---|---|---|---|
| Per FR measurement gap | E-UTRA and, FR1 if configured | RAT and FR1 and/or FR2 non-NR RAT | 0, 1, 2, 3 |
| | FR2 if configured | | No gap |
| | E-UTRA and, FR1 if configured | FR1 only | 0-11 |
| | FR2 if configured | | No gap |
| | E-UTRA and, FR1 if configured | FR2 only | No gap |
| | FR2 if configured | | 12-23 |
| | E-UTRA and, FR1 if configured | non-NR RAT and FR1 | 0, 1, 2, 3 |
| | FR2 if configured | | No gap |
| | E-UTRA and, FR1 if configured | FR1 and FR2 | 0-11 |
| | FR2 if configured | | 12-23 |
| | E-UTRA and, FR1 if configured | non-NR RAT and FR2 | 0, 1 ,2, 3 |
| | FR2 if configured | | 12-23 |
| | E-UTRA and, FR1 if configured | non-NR RAT and FR1 and FR2 | 0, 1, 2, 3 |
| | FR2 if configured | | 12-23 |

Note:
if GSM or UTRA TDD or UTRA FDD inter-RAT frequency layer is configured to be monitored, only measurement gap pattern #0 and #1 can be used for per-FR gap in E-UTRA and FR1 if configured, or for per-UE gap.
$^{Note1}$ Non-NR RAT includes E-UTRA, UTRA and/or GSM.

The measurement gap patterns for standalone (SA) NR operation, in which all the serving cells to which the UE is connected belong to the NR RAT, are the same as for NSA operation shown in Table 1. However, Table 3 shows the applicability for SA operation, which is different than the applicability for NSA operation shown in Table 2.

measurement objects. Moreover, the principles for measurement gap sharing in NR have not been addressed in 3GPP standardization. Applying the same measurement gap sharing concept as in E-UTRA (briefly mentioned above), where cell detection time and L1 measurement period are scaled by the number of carriers the UE has in its set of measurement

TABLE 3

| Measurement gap pattern configuration | Serving cell | Measurement Purpose | Applicable Gap Pattern Id |
|---|---|---|---|
| Per-UE measurement gap | FR1, or FR1 + FR2 | E-UTRA only | 0, 1, 2, 3 |
| | | FR1 and/or FR2 | 0-11 |
| | | E-UTRAN and FR1 and/or FR2 | 0, 1, 2, 3 |
| | FR2 | E-UTRA only | 0, 1, 2, 3 |
| | | FR1 only | 0-11 |
| | | FR1 and FR2 | 0-11 |
| | | E-UTRAN and FR1 and/or FR2 | 0, 1, 2, 3 |
| | | FR2 only | 12-23 |
| Per FR measurement gap | FR1 if configured | E-UTRA only | 0, 1, 2, 3 |
| | FR2 if configured | | No gap |
| | FR1 if configured | FR1 only | 0-11 |
| | FR2 if configured | | No gap |
| | FR1 if configured | FR2 only | No gap |
| | FR2 if configured | | 12-23 |
| | FR1 if configured | E-UTRA and FR1 | 0, 1, 2, 3 |
| | FR2 if configured | | No gap |
| | FR1 if configured | FR1 and FR2 | 0-11 |
| | FR2 if configured | | 12-23 |
| | FR1 if configured | E-UTRA and FR2 | 0, 1, 2, 3 |
| | FR2 if configured | | 12-23 |
| | FR1 if configured | E-UTRA and FR1 and FR2 | 0, 1, 2, 3 |
| | FR2 if configured | | 12-23 |

Although the existing configurations represented by the tables above specify the configurations and applicability for individual measurements, they do not address the problem of "measurement gap sharing" between multiple configured objects, would in most cases lead to unnecessary long delays such as, e.g., in detecting neighbour cells and/or detecting that a particular neighbour cell is a suitable candidate for handover or offloading. As such, applying these same principles to NR measurement scheduling would have a negative impact on UE mobility and inter-cell load balancing, which could result in degraded network capacity (e.g., number of users), data rates, coverage, and/or end user experience.

Accordingly, there is a need for an improved technique for scheduling measurements according to gap sharing between multiple measurement objects configured for a single UE, that provides the desired quality of measurements but does not result in such degradations to network performance and/or user experience.

Exemplary embodiments of the present disclosure account for the possibility that measurements for different NR carriers (or BWPs) can be configured with different SMTC periods and/or SMTC offsets, resulting in the various configured measurements may compete all measurement gap resources (e.g., if the SMTC patterns fully overlap), some of the resources (e.g., if the SMTC patterns partially overlap), or none of the resources (e.g., if certain SMTC patterns do not overlap at all). Exemplary embodiments utilize information about measurements activities (e.g., objects) and measurement gap resources to determine whether each respective measurement activity is a candidate to use each respective gap resource, and further to determine scaling of at least one measurement period associated with the measurement activities.

Various benefits can result from scaling measurements periods in this manner For example, layer-1 (L1) measurement periods and, consequently, delay until cell identification are reduced, such that suitable cells for handover or offloading can be identified more quickly. One exemplary resulting benefit is that handover can be performed before serving cell quality becomes critically low. Another resulting exemplary benefit is that cell offloading can be performed before downlink buffers in the base station overrun.

As a further example, when multiple carriers (e.g., measurement objects) are configured for measurement with different SMTC/SSB periodicities, the carriers with shorter SMTC periods can be measured on a greater number of measurement gaps, and thereby require a shorter L1 measurement period, time index determination period and PSS/SSS sync time delay to obtain measurements that meet a specified level of accuracy and/or reliability. In contrast, other carriers configured with longer SMTC/SSB periodicity can require measurement over a longer measurement period (e.g., L1 measurement period, time-index determination period, and/or PSS/SSS sync time delay) to obtain measurement with the same level of accuracy and/or reliability.

Figure 2:
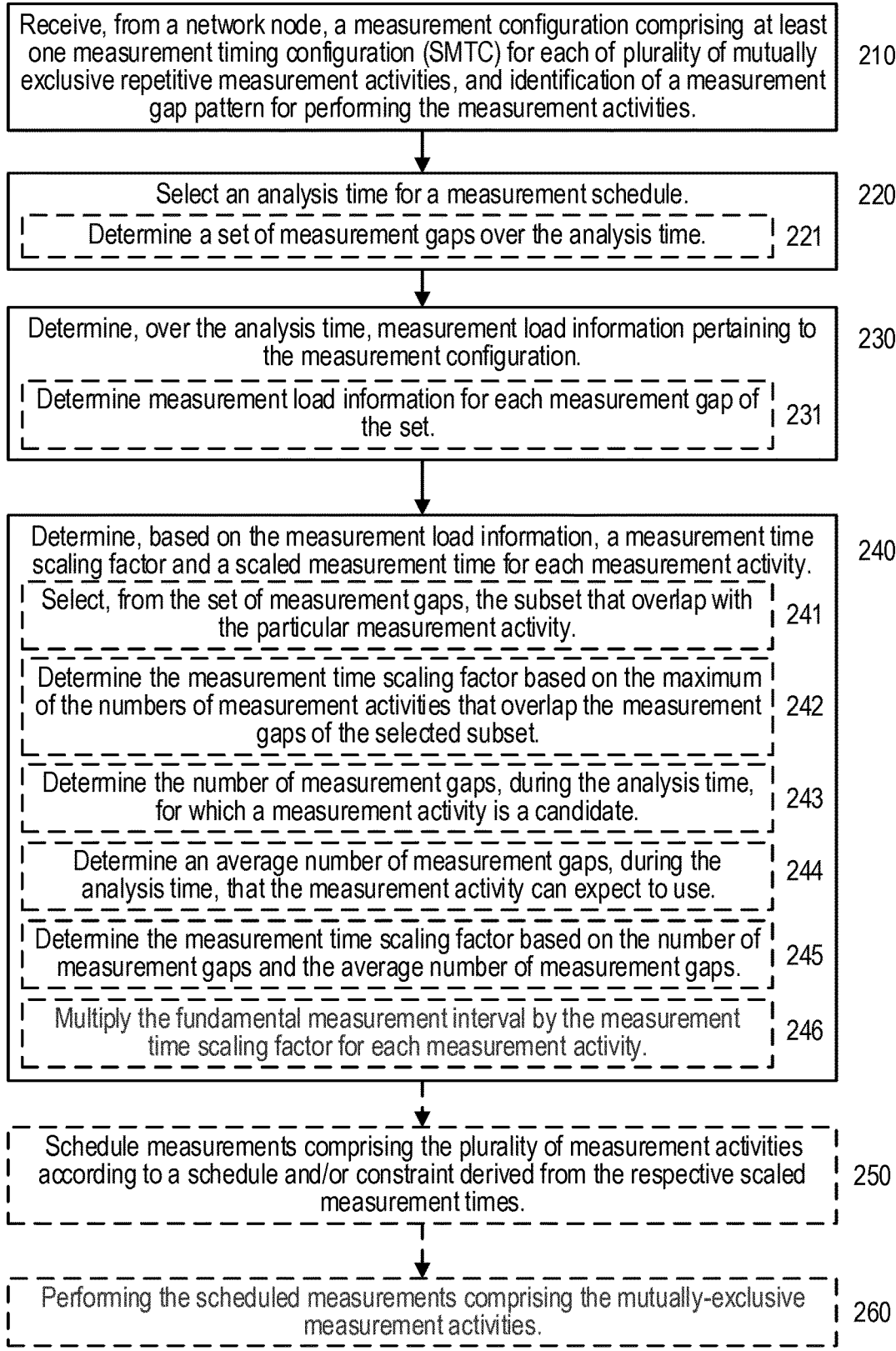
FIG. 2 is a flow diagram of an exemplary method and/or procedure performed by a user equipment (UE), according to various exemplary embodiments of the present disclosure.

FIG. 2 is a flow diagram of an exemplary method and/or procedure for determining measurement periods for a plurality of measurement activities in a wireless network, according to various exemplary embodiments of the present disclosure. The exemplary method and/or procedure shown in FIG. 2 can be performed by a user equipment (UE, e.g., wireless device, or component thereof such as a modem) in communication with a serving network node (e.g., eNB, gNB, ng-eNB, en-gNB, base station, etc., or component thereof) as shown in or described in relation to other figures herein. Furthermore, the exemplary method and/or procedure shown in FIG. 2 can be utilized cooperatively with the exemplary method and/or procedures shown in FIG. 5 to achieve exemplary benefits described herein. Although FIG. 2 shows blocks in a particular order, this order is merely exemplary and the operations shown in FIG. 2 can be performed in a different order than shown in, and can be combined and/or divided into blocks having different functionality. Optional operations are indicated by dashed lines.

In block 210, the UE can receive, from the serving network node, a measurement configuration comprising at least one measurement timing configuration (SMTC) for each of a plurality of mutually exclusive repetitive measurement activities (e.g., measurement objects), and identification of a measurement gap pattern for performing the plurality of measurement activities. For example, the UE can receive the measurement configuration via Radio Resource Control (RRC) signaling from the serving network node. The plurality of mutually-exclusive repetitive measurement activities can comprise measurements on one or more inter-frequency or inter-radio access technology (inter-RAT) carriers. As used herein in the context of measurement activities, the term "mutually exclusive" means that two signals cannot be measured simultaneously and/or within a single time interval that permits only a single measurement. This can be due to UE complexity and/or capability limitations, or due to characteristics of respective signals to be measured (e.g., in different network transmit antenna beams and/or UE receive antenna beams).

For example, mutually exclusive repetitive measurement activities can include mobility-related measurements on different inter-frequency (and/or inter-RAT) carriers, such that it is not feasible to measure the carriers simultaneously. Instead, such mutually exclusive repetitive measurement activities must be performed in a time-division multiplex (TDM) fashion over a plurality of time intervals. Measurements on the same NR carrier but on different BWPs can also be mutually exclusive. Another example is one mobility-related measurement on an intra-frequency carrier and at least one other on an inter-frequency (and/or inter-RAT) carrier.

Other examples of mutually exclusive repetitive measurement activities are measurements on signals with different numerology (e.g., subcarrier spacing or SCS), measurements on signals that are received by different receiver beams (e.g., narrow beam directed to a serving cell and narrow beam directed to a neighbour cell) that cannot be configured simultaneously. Another example of mutually exclusive repetitive measurement activities is mobility measurements and positioning measurements on the same inter-frequency (or inter-RAT) carrier. In this case, due to the different nature of the measurements and/or UE complexity considerations, such measurements must be carried out in a TDM fashion, e.g., as in legacy LTE UEs.

Examples of mobility measurements that can be mutually exclusive include PSS detection, SSS detection, SSB index detection using PBCH DM-RS or by decoding PBCH, RSRP measurement, RSRQ measurement, System frame number and frame border time difference (SFTD) measurement, and signal-to-interference-and-noise ratio (SINR) measurement. An example of a mobility measurement that can be mutually exclusive is an reference signal time difference (RSTD) measurement.

Such measurements are typically performed on periodic signals that are transmitted according to a repetition period, and with a pre-determined and predictable content. Examples of such signals suitable for measurements include SSB (e.g., PSS/SSS/PBCH), demodulation reference signals (DM-RS), CRS, channel state information reference signal (CSI-RS), discovery reference signal (DRS), positioning reference signal (PRS), and tracking reference signals (TRS). Although included as exemplary, the content of PBCH can change between different repetition periods and, in general, needs to be decoded.

Furthermore, a "set" of periodic signals generally comprises a group of periodic signals (e.g. PSS, SSS, DM-RS and PBCH) and is generally not limited to a single instance (e.g. SSB index) of such signals. For example, a set of periodic signals can comprise periodic signals from one or more cells, and/or one or more transmit beams, in an SSB burst. Furthermore, sets of periodic signals are not limited to the NR context. For instance, E-UTRA signals PSS, SSS, and CRS can be described as a set of periodic signals with, e.g., a periodicity of 10 ms, where that set comprises two instances of PSS, two versions (indexes) of SSS, and up to 10 indices (subframes) of CRS depending on duplex mode, Multicast broadcast single frequency network (MBSFN) configuration, and when applicable, TDD UL/DL subframe configuration in use.

Likewise, a measurement activity can comprise one or more measurements conducted on the same set of periodic signals, e.g., signal strength measurements (RSRP), signal quality measurements (RSRQ and/or SINR), and/or cell/beam detection, which is often referred to as SSB detection or PSS/SSS synchronization. In addition, depending on the type of measurements to be performed, a measurement activity can be associated with one or more measurement periods, measurement reporting periods, or delays. For instance, there may be one measurement period associated with RSRP, RSRQ and SINR measurements, and another associated with cell and/or beam detection (SSB detection), although the periodicity of the signals (e.g. PSS, SSS, DM-RS, and PBCH) is the same.

In block 220, the UE can select an analysis period for a measurement schedule. For example, the UE can select an analysis period based on the periodicities of the sets of signals involved (e.g., the respective MGRP configurations) and/or based on some fixed value (e.g., 480 ms as in LTE). The analysis period can be selected such that it covers at least the longest periodicity of the sets of periodic signals onto which measurements are to be conducted. As an example of the above selection principles, the analysis period can be selected as a fixed value according to the set of signals involved, with the fixed value being a common multiple of the periodicities of these signals. In this manner, the fixed value can cover the longest periodicity. The analysis period can alternatively be referred to as a gap utilization repetition period (GURP), and can be defined as the least common multiple (LCM) of the periods of: 1) the sets of periodic signals to be used for mobility measurements (if any); 2) the sets of periodic signals to be used for positioning measurements (if any); and 3) the MGRP. In other words:

$$GURP=LCM(MGRP, T_{SMTC\#0}, T_{SMTC\#1}, \ldots, T_{PRS\#0}, T_{PRS\#1}, \ldots)$$

where $T_{SMTC\#0}$, $T_{SMTC\#1}$, etc are SMTC periods {5, 10, 20, 40, 80, 160 ms} for the different carriers onto which mobility measurements are to be conducted; $T_{PRS\#0}$, $T_{PRS\#1}$, etc. are PRS periods {5, 10, 20, 40, 80, 160, 320, 640, 1280 ms} for carriers onto which positioning measurements are to be conducted; and MGRP is the configured measurement gap repetition period {20, 40, 80, 160 ms}. In case E-UTRA mobility measurements are to be carried out, those may for instance be modelled in the expression above as having an SMTC period of for example 5 ms, 10 ms, etc.

If the periodicities for signals as well as for the measurement gap pattern are related to each other by powers of two, the above expression simplifies to the longest period of: 1) the sets of periodic signals to be used for mobility measurements (if any); 2) the sets of periodic signals to be used for positioning measurements (if any); and 3) the MGRP. In other words, the GURP can be determined as:

$$GURP=Max(MGRP, T_{SMTC\#0}, T_{SMTC\#1}, \ldots, T_{PRS\#0}, T_{PRS\#1}, \ldots).$$

Other examples of periodic signals used for measurements include discovery reference signals (DRS) on E-UTRA carrier with frame structure type #3 (FS3), which is also referred to as unlicensed carrier or Licensed-Assisted Access (LAA). Examples of DRS signals include PSS/SSS/CRS transmitted in a DRS measurement timing configuration (DMTC) with periodicity of 40, 80 or 160 ms. Other periodic signals for other measurements not described here, but which fulfil the power-of-two relation to other signal set periodicities and MGRP may be accounted in the above equation in a similar manner The GURP comprises J=GURP/MGRP measurement gaps, denoted by index j={0,1, . . . J−1}, each separated by duration MGRP. The respective gap(s) in the GURP for which a particular measurement activity is a candidate depends on the period and the offset of the signals used to conduct the particular measurements, and further on the time reference assumed for the start of the GURP. For simplicity of explanation, we assume that the GURP time reference is the border of system frame number 0, such that this time reference is aligned with the time reference used for configured measurement offsets. Accordingly, in some embodiments, the operations of block 220 can include the operations of sub-block 221, where the UE can determine a set of measurement gaps over the duration of the analysis period.

After selecting the analysis period (e.g., GURP) in block 220, in block 230 the UE can determine, over the analysis period, measurement load information related to the measurement configuration. For example, the UE can determine the measurement load information pertaining to the GURP in various ways. In general, for each of the J measurement gaps in the analysis period (e.g., determined in sub-block 221), the UE can determine which of the plurality of measurement activities (denoted by index i) are candidates for using the $j^{th}$ gap. For example, some of the J gaps in the GURP may be used by more measurement activities than others, and certain gaps may not be used by any measurement activity at all.

The actual distribution of candidate measurement activities across the respective gaps depends on the SMTC periods relative to the MGRP, and on the SMTC offsets relative to the measurement gap offset. For example, if a set of periodic signals has an SMTC=80 ms and MGRP=40 ms, every second measurement gap can be used for that particular measurement activity. If the analysis period is determined as 80 ms, the particular one of the (J=2) gaps used in that period is determined by the relative offset between the SMTC and the measurement gap, as well as the reference point used for the analysis period. Even so, the reference point (time reference) for the analysis period is not as important so long as the sets of periodic signals and the measurement gap pattern use the same reference point (e.g., border of system frame number 0 as briefly mentioned above, or any other system frame number value).

The measurement load information can be determined and/or represented in various ways. For example, it can be determined as the number of mutually exclusive measurement activities that are candidates for using each respective gap j of the J gaps. Alternatively, it can be determined as a list of the measurement activities that are candidates of using each respective gap j of the J gaps. In other embodiments, it can be determined as some combination of the above representations. In more general terms, the operations of block 230 can include the operations of sub-block 231, where the UE can, for each particular measurement gap of the set (e.g., determined in block 221), determine one or more of the following: a number of measurement activities that overlap the particular measurement gap, or a list of measurement activities that overlap the particular measurement gap.

In some embodiments, if a set of periodic signals associated with a measurement activity i is at least partially overlapping a particular measurement gap j, the measurement activity is considered as a candidate user of that gap. In other embodiments, the overlap may be required to meet a threshold amount for measurement activity i to be a candidate for gap j. In some embodiments, the UE can determine the measurement load information by stepping through the J gaps in the GURP, and for each gap determining a start time and an end time of the net gap, where the time interval between the start time and the end time constitutes the MGL minus one radio switching margin (RSM) at the beginning and one radio switching margin at the end of the gap. The radio switching margin can be specified in 3GPP standards or used as an agreed assumption when determining load information, or it may be known from the design of the particular UE hardware and software. The radio switching margin can be particular to a frequency range (FR), e.g., 0.5 ms for FR1 (sub-6 GHz) and 0.25 ms for FR2 (above 24 GHz).

In other words, the UE can determine the start time and end time of measurement gap j in the GURP according to the above description as:

$T\_start(j) = MGoffset + j*MGRP + RSM$, $T\_end(j) = MGoffset + j*MGRP + MGL - RSM$, where T_start(j) and T_end(j) are the start and end times of the j:th measurement gap in the GURP, MGoffset is the measurement gap offset, MGRP is the measurement gap repetition period, MGL is the measurement gap length, and RSM is the radio switching margin. For example, the MGoffset can be used to shift the position of the measurement gap pattern by some fraction of a millisecond, as discussed above.

The GURP also comprises R=GURP/SMTCperiod repetitions for a particular set of periodic signals configured with an SMTCperiod. For a particular repetition r of a particular set of periodic signals, the UE can determine start and end times for that particular repetition according to:

$S\_start(r) = SMTCoffset + r*SMTCperiod$, and $S\_end(r) = SMTCoffset + r*SMTCperiod + SMTCwindow$, where S_start(r) and S_end(r) are the start and end times for the r:th repetition of the set of signals over the GURP, SMTCoffset is the SMTC offset, SMTCwindow is the SMTC window length, and r={0, 1, . . . R−1}.

In some embodiments, if any parts of the intervals [S_start (r), S_end(r)], r={0, 1, . . . R−1}, overlaps the jth measurement gap interval [T_start(j), T_end(j)], then the measurement activity associated with this set of periodic signals is a candidate user of the j:th measurement gap in the GURP. In other embodiments, the overlap may be required to meet a threshold amount for measurement activity i to be a candidate for gap j.

Other E-UTRA mobility-related signals and/or NR PRS can be handled similarly. For the case of E-UTRA mobility measurements, a window length of 10 ms could be assumed, whereas for PRS the window length can be a configured duration of the PRS occasion. For example, the window length can be 4-5 ms assuming a maximum PRS occasion length of 6 ms, or for dense PRS measurements, the window length can be 32 ms assuming a PRS occasion length of 30 ms in FDD. In either case, the assumption allows a 1 ms switching margin in the beginning and in the end. In dense PRS, the maximum PRS occasion length comprises 160 PRS subframes, such that there can be more than one measurement gaps during PRS occasion if MGRP is configured to be less than maximum 160 ms.

In block 240, the UE can determine, based on the measurement load information, a measurement time scaling factor and a scaled measurement time for each of the plurality of measurement activities. For example, the scaling factors can be determined for L1 measurement periods, PSS/SSS sync period or detection time delay, and/or time index acquisition delay. More generally, measurement periods can be defined in 3GPP specifications based on how many measurement snapshots (samples) are needed to achieve a filtered result (e.g. average, weighted average, recursive average, etc.) that fulfills some measurement accuracy requirement(s). Alternately, measurement periods can be defined according to the number of attempts (snapshots, samples) needed in order to accurately detect the presence of a signal using, e.g., matched filtering, correlation, hypothesis testing, etc. Alternately, measurement periods and/or delays related to time index acquisition can be defined by the number of attempts needed to reliably decode the system frame number (SFN) of the target cell PBCH, or to detect the used PBCH DM-RS sequence. The measurement period may also depend on frequency range and whether beam sweeping is used by the network node and/or the UE.

In any event, a measurement period can be specified according to a fundamental measurement interval that is applicable only when a single measurement activity is using a measurement gap pattern. For example, the 480 ms L1 measurement period used in E-UTRA for RSRP and RSRQ measurements is a fundamental measurement interval. Another example is the cell detection delay time used for inter-frequency cell identification in E-UTRA, i.e., $$T_{Basic\_Identify\_Inter} \cdot \frac{480}{T_{Inter1}}.$$

Nevertheless, when multiple measurement activities compete for the same measurement gap resources, it will take longer time for each respective measurement activity to acquire the requisite number of snapshots (samples) needed to meet the associated performance requirement for measurement accuracy or detection reliability. As such, when there is more than one measurement activity using the measurement gap pattern, measurement periods longer than the associated fundamental measurement intervals can be expected. The resulting longer measurement periods can be considered as scaled versions of the corresponding fundamental measurement intervals.

For a plurality of M measurement activities to be performed, each measurement activity is denoted with index i, where i={0 . . . M−1}. As mentioned above, each measurement gap in the GURP is denoted with index j, where j={0 . . . J−1}. For each measurement activity i and measurement gap j, the parameter $\lambda_{i,j}=1$ when the measurement activity is a candidate user of measurement gap j, and $\lambda_{i,j}=0$ otherwise. In some embodiments, the measurement load information can comprise the number of candidate measurements (minimum 0 and maximum M) competing for the same measurement gap j. The measurement load information for the j:th measurement gap in the GURP is denoted $\theta_j$, where $j=\{0 \ldots J-1\}$, and can be expressed as $$\theta_j = \sum_{i=0}^{Nma-1} \lambda_{i,j}.$$

In other words, the measurement load information determined according to the above equation represents the number of measurement activities that overlap with (e.g., occur during) the particular measurement gap, j.

According to the operations of block 240, the UE can determine the scaling factors to apply to the fundamental measurement interval associated with each respective measurement activity by analyzing the measurement load information, determined in block 230, for the measurement gaps in the GURP for which the measurement activity is a candidate user. Various exemplary techniques for the operations of block 240 are described below.

In a first exemplary embodiment, the scaling factor for the i:th measurement activity, $K_i$, can be determined based on the gap j that has the highest measurement load among the portion of the gaps (e.g., the set determined in sub-block 221) used by measurement activity i. In other words, j is the measurement gap with highest or maximum number of other measurement activities competing with activity i. (sub-block 242 in FIG. 2), given by:

$$K_i = \max(\{\theta_j : \lambda_{i,j}=1, j=0 \ldots J-1\}).$$

In a second exemplary embodiment, the scaling factor for the i:th measurement activity, $k_i$, can be determined (sub-block 245) by the ratio:

$$K_i = \frac{\sum_{j=0}^{J-1} \lambda_{i,j}}{\sum_{j=0}^{J-1} \frac{\lambda_{ij}}{\theta_j}},$$

with the numerator representing the number of measurement gaps for which the measurement activity is a candidate (sub-block 243), and denominator represents the average number of measurement gaps over the GURP that the measurement activity can expect to use and/or to be allowed to use (sub-block 244), taking into account the measurement load in each particular gap into account and requirements (e.g., a policy) for on-average fair-sharing of each gap (i.e., all measurement activities that are candidate users for a gap get to use it equally on average).

In a third exemplary embodiment, the scaling factor for the i:th measurement activity, $K_i$, can be determined in a manner similar to the second embodiment, but providing additional margin by computing according to:

$$K_i = \text{ceil}\left(\frac{\sum_{j=0}^{J-1} \lambda_{i,j}}{\sum_{j=0}^{J-1} \frac{\lambda_{ij}}{\theta_j}}\right),$$

using the ceiling operation (ceil), by which a derived scaling factor with fractional part is rounded up to the closest larger integer. Whereas the scaling factor derived in the second method is correct on average (e.g., over multiple GURPs), in short term there may be some jitter due to different measurement load for different gaps for which the measurement activity is a candidate user. Accordingly, some additional margin can be added to the scaling factor according to the third embodiment.

Nevertheless, there are many techniques for adding margins to account for the jitter, and the operation above is merely an example. Even so, some jitter often can be tolerated for fulfilling measurement performance requirements, which can be specified at a particular percentile (e.g., 90%) for reliability, accuracy, and/or delay. For example, in cell detection or event detection that one cell becomes X dB stronger than another cell, occasionally having a small additional delay can be acceptable, as long as the UE meets the detection times at the $90^{th}$ percentile. In other words, any margin added using, e.g., the above relation merely provides some more headroom to the $90^{th}$ percentile delay.

Additionally, the three exemplary embodiments briefly discussed above can be viewed as particular embodiments of a more generalized group of embodiments, in which the scaling factor for the i:th measurement activity can be determined according to:

$$K_i = f(\lambda_i, \theta)$$

where $$\lambda_i = [\lambda_{i,0}\ \lambda_{i,1}\ \ldots\ \lambda_{i,j-1}],\ \theta = [\theta_0\ \theta_1\ \ldots\ \theta_{j-1}],$$

J is the number of measurement gaps over the GURP, and $f(\lambda_i, \theta)$ is a function that calculates or determines a scaling factor $K_i$ using the gap usage information for the i:th measurement activity, $\lambda_i$, and the measurement load information for the gaps, $\theta$. For example, the functions $f(\lambda_i, \theta)$ corresponding to the three exemplary embodiments above can be written as:

$$f(\lambda_i, \theta) = \max(\{\theta_j : \lambda_{i,j}=1, j=0 \ldots J-1\})$$

$$f(\lambda_i, \theta) = \frac{\sum_{j=0}^{J-1} \lambda_{i,j}}{\sum_{j=0}^{J-1} \frac{\lambda_{ij}}{\theta_j}}$$

$$f(\lambda_i, \theta) = \text{ceil}\left(\frac{\sum_{j=0}^{J-1} \lambda_{i,j}}{\sum_{j=0}^{J-1} \frac{\lambda_{ij}}{\theta_j}}\right)$$

One common aspect of these three exemplary embodiments is that they only take into account the measurement pattern of the particular measurement activity i for which a scaling factor $K_i$ is determined. Instead, they take into account the overall load in each measurement gap in the GURP used by the measurement activity i for which a scaling factor $K_i$ is derived.

As such, the three exemplary embodiments can be viewed as particular embodiments of an even more generalized group of embodiments, in which the set of scaling factors for all M measurement activities may be derived simultaneously based on all available information. These relations can be expressed as:

$$K = g(\Gamma),$$

where $$K = \begin{bmatrix} K_0 \\ K_1 \\ \vdots \\ K_{M-2} \\ K_{M-1} \end{bmatrix},$$

$$\Gamma = \begin{bmatrix} \lambda_{0,0} & \lambda_{0,1} & & \lambda_{0,J-2} & \lambda_{0,J-1} \\ & & \cdots & & \\ \lambda_{1,0} & \lambda_{1,1} & & \lambda_{1,J-2} & \lambda_{1,J-1} \\ \vdots & & \ddots & \vdots & \\ \lambda_{M-2,0} & \lambda_{M-2,1} & & \lambda_{M-2,J-2} & \lambda_{M-2,J-1} \\ & & \cdots & & \\ \lambda_{M-2,0} & \lambda_{M-2,1} & & \lambda_{M-1,J-2} & \lambda_{M-1,J-1} \end{bmatrix}$$

J is the number of measurement gaps over the GURP, M is the number of measurement activities, and g(Γ) is a function that takes as input the gap usage information for each measurement activity that is competing for the measurement gap resources and calculates or determines one scaling factor for each measurement activity.

Compared to the first generalized group, discussed above, this more generalized group allows further optimization, tightly coupled to how the UE potentially will schedule the measurements, since it can cover multilateral trading of measurement opportunities in a GURP or over multiple GURPs. For example, this could be expressed as a rule or heuristic such as: "If measurement activity k gets to measure in this gap in this GURP, measurement activity l will get to measure in that other gap in this GURP, and measurement activity m will get to measure in that gap in that GURP."

In the context of these generalized embodiments, the term "function" can denote a mathematical function, an algorithm, a set of logical and arithmetic operations (hardware), or a programmatic construction (software). Furthermore, the information described above as inputs to such generalized functions is merely exemplary. Additional inputs can include MGRP, mode of operation, additional constraints (e.g. utilization restricted to some fraction of gaps in the measurement gap pattern), etc.

After determining the measurement time scaling factor according to any of the exemplary embodiments described above, the UE can also determine the scaled measurement time for each measurement activity. This can be done, for example, by multiplying a fundamental measurement interval for each measurement activity by the corresponding measurement time scaling factor determined for the particular measurement activity (sub-block 246).

It is appreciated that there are multiple methods for deriving information on which repetitions of sets of periodic signals falls into which measurement gap in the GURP. The example provided above merely serves as a non-limiting example. The essence is that the UE, for each gap, determines whether a measurement activity is a candidate for using that gap. Moreover, it is appreciated that the order by which certain operations have been outlined above may differ. For instance, a UE might first analyze the load in terms of how measurement activities overlap each other with respect to the plurality of SMTC windows, and then map this information to the measurement gap pattern. Regardless of order, however, the end-result is that the UE determines the measurement load for each measurement gap in the GURP.

In some embodiments, after determining the scaled measurement times for the respective measurement activities, in block 250 the can schedule the plurality of measurement activities based on a schedule and/or constraint derived from the calculated scaled measurement times. The schedule and/or constraint can be further based on some principle of sharing the J measurement gaps by the measurement activities. For example, such gap-sharing principles can be specified and/or derived from 3GPP specifications. In general, a "constraint" can be any type of pre-configured (e.g., based on 3GPP specifications), operational, situational, or other restriction and/or limitation to the UE's measurement capabilities, that can be derived from and/or related to the calculated scaled measurement times. In some embodiments, the UE performing the scheduled measurement comprising the mutually-exclusive measurement activities, e.g., according to the schedule and/or constraint.

In the following, non-limiting examples are provided to illustrate the principles of the exemplary embodiments discussed above. FIG. 3 is a timing diagram of an exemplary use case comprising five (5) measurement activities (or objects) and four (4) measurement gaps with MGRP 40 ms. These five measurement objects correspond to carriers 0-4 configured as:

Carrier 0, with SMTC period 160 ms and SMTC offset of 0 ms,
Carrier 1, with SMTC period 160 ms and SMTC offset of 40 ms,
Carrier 2, with SMTC period 80 ms and SMTC offset of 0 ms,
Carrier 3, with SMTC period 80 ms and SMTC offset of 40 ms, and
Carrier 4, with SMTC period 40 ms and SMTC offset of 0 ms.

All of the SMTC offsets above are expressed relative to the chosen reference for the measurement gap pattern. A measurement gap pattern with MGRP of 40 ms has four (4) gaps during the SMTC period of 160 ms, referred to as 0-3. Following the conventional measurement gap sharing principles, discussed in the background above, carriers 0-4 would be allotted a scaling factor $N_{req}=5$, with cell detection times and L1 measurement periods would be extended by the same 5× factor for all carriers.

According to the exemplary embodiments of the present disclosure, an analysis period (e.g., GURP) of 160 ms is selected based on the maximum 160 ms SMTC period configured for carriers 0 and 1. The measurement load analysis:

Carrier 0: $\lambda_{0,0}=1$, $\lambda_{0,1}$, $0\lambda_{0,2}=0$, $\lambda_{0,3}=0$
Carrier 1: $\lambda_{1,0}=0$, $\lambda_{1,1}$, $1\lambda_{1,2}=0$, $\lambda_{1,3}=0$
Carrier 2: $\lambda_{2,0}=1$, $\lambda_{2,1}$, $0\lambda_{2,2}=1$, $\lambda_{2,3}=0$
Carrier 3: $\lambda_{3,0}=1$, $\lambda_{3,1}$, $1\lambda_{3,2}=0$, $\lambda_{3,3}=1$
Carrier 4: $\lambda_{4,0}=1$, $\lambda_{4,1}$, $1\lambda_{4,2}=1$, $\lambda_{4,3}=1$ results in the following measurement load information:

Gap 0: $\theta_0=3$
Gap 1: $\theta_1=3$
Gap 2: $\theta_2=2$
Gap 3: $\theta_3=2$.

According to the exemplary embodiments of the present disclosure, using the first exemplary method described above results in the following scaling factors:

Carrier 0: $K_0=3$
Carrier 1: $K_1=3$
Carrier 2: $K_2=3$
Carrier 3: $K_3=3$
Carrier 4: $K_4=3$ Similarly, using the second exemplary method described above results in the following scaling factors:
 Carrier 0: $K_0=3$
 Carrier 1: $K_1=3$
 Carrier 2: $K_2=2.4$
 Carrier 3: $K_3=2.4$
 Carrier 4: $K_4=2.4$ Finally, using the third exemplary method described above results in the following scaling factors:
 Carrier 0: $K_0=3$
 Carrier 1: $K_1=3$
 Carrier 2: $K_2=3$
 Carrier 3: $K_3=3$
 Carrier 4: $K_4=3$ Assuming a fundamental measurement interval for Carrier 0 of 480 ms, the scaled measurement period for carrier 0 is, for all three exemplary methods, $K_0 \cdot 480=1440$ ms. Scaled measurement times for the measurement objects associated with the other carriers can be determined in a similar manner Measurement schedules for the various measurement objects can be determined over the respective scaled measurement times, taking into account the respective measurement configurations (e.g., SMTC period and offset) and, optionally, any UE constraints related to the scaled measurement time.

FIG. 4 is a timing diagram of another exemplary use case comprising five (5) measurement activities (or objects) and four (4) measurement gaps with MGRP 40 ms. These five measurement objects correspond to carriers 0-4 configured as:
 Carrier 0, with SMTC period 160 ms and SMTC offset of 0 ms,
 Carrier 1, with SMTC period 160 ms and SMTC offset of 40 ms,
 Carrier 2, with SMTC period 160 ms and SMTC offset of 80 ms,
 Carrier 3, with SMTC period 160 ms and SMTC offset of 80 ms, and
 Carrier 4, with SMTC period 40 ms and SMTC offset of 0 ms.

According to the exemplary embodiments of the present disclosure, an analysis period (e.g., GURP) of 160 ms is selected based on the maximum 160 ms SMTC period configured for carriers 0 and 1. The measurement load analysis:
 Carrier 0: $\lambda_{0,0}=1$, $\lambda_{0,1}$, $0\lambda_{0,2}=0$, $\lambda_{0,3}=0$
 Carrier 1: $\lambda_{1,0}=0$, $\lambda_{1,1}$, $1\lambda_{1,2}=0$, $\lambda_{1,3}=0$
 Carrier 2: $\lambda_{2,0}=1$, $\lambda_{2,1}$, $0\lambda_{2,2}=1$, $\lambda_{2,3}=0$
 Carrier 3: $\lambda_{3,0}=1$, $\lambda_{3,1}$, $1\lambda_{3,2}=0$, $\lambda_{3,3}=1$
 Carrier 4: $\lambda_{4,0}=1$, $\lambda_{4,1}$, $1\lambda_{4,2}=1$, $\lambda_{4,3}=1$
results in the following measurement load information:
 Gap 0: $\theta_0=2$
 Gap 1: $\theta_1=2$
 Gap 2: $\theta_2=3$
 Gap 3: $\theta_3=1$ According to the exemplary embodiments of the present disclosure, using the first exemplary method described above results in the following scaling factors:
 Carrier 0: $K_0=2$
 Carrier 1: $K_1=2$
 Carrier 2: $K_2=3$
 Carrier 3: $K_3=3$
 Carrier 4: $K_4=3$ Similarly, using the second exemplary method described above results in the following scaling factors:
 Carrier 0: $K_0=2$
 Carrier 1: $K_1=2$
 Carrier 2: $K_2=3$
 Carrier 3: $K_3=3$
 Carrier 4: $K_4=24/13\approx1.85$ Finally, using the third exemplary method described above results in the following scaling factors:
 Carrier 0: $K_0=2$
 Carrier 1: $K_1=2$
 Carrier 2: $K_2=3$
 Carrier 3: $K_3=3$
 Carrier 4: $K_4=2$ Assuming a 480-ms fundamental measurement interval for carrier 0, the scaled measurement time for carrier 0 is, for all three exemplary methods, $K_0 \cdot 480=960$ ms. Scaled measurement times for the measurement objects associated with the other carriers can be determined in a similar manner Measurement schedules for the various measurement objects can be determined over the respective scaled measurement times, taking into account the respective measurement configurations (e.g., SMTC period and offset) and, optionally, any UE constraints related to the scaled measurement times.

The three exemplary methods discussed above are not mutually exclusive. In some exemplary embodiments, the UE can be configured to derive the scaling factor using a particular available method (e.g. method 1, 2, or 3), according to a pre-defined rule and/or information received from the network node. The UE can further be configured to switch between different available methods for deriving the scaling factor in order to meet certain measurement requirements related to one or more carriers (e.g., cell identification time). Likewise, the UE can be configured to switch between different available methods for deriving the scaling factor in case the UE has not performed any measurement (e.g., sample in SMTC) for more than certain time period (e.g., for more than Q number of SMTC periods where Q can be pre-defined or configured by the network node).

After determining the scaling factor (Ki), the UE can scale the basic measurement time interval (e.g. L1 measurement period, SSB time index determination period, PSS/SSS synchronization time delay, cell identification time, etc.). Applying a larger scaling factor can result in increased the measurement time compared to a smaller scaling factor. Even though the scaling factor facilitates better scheduling of mutually-exclusive measurements, measurements on cells of a particular carrier can be performed within the reference (unscaled) measurement time interval so long as all measurement gaps in the pattern can be used for measurement of that carrier.

Figure 5:
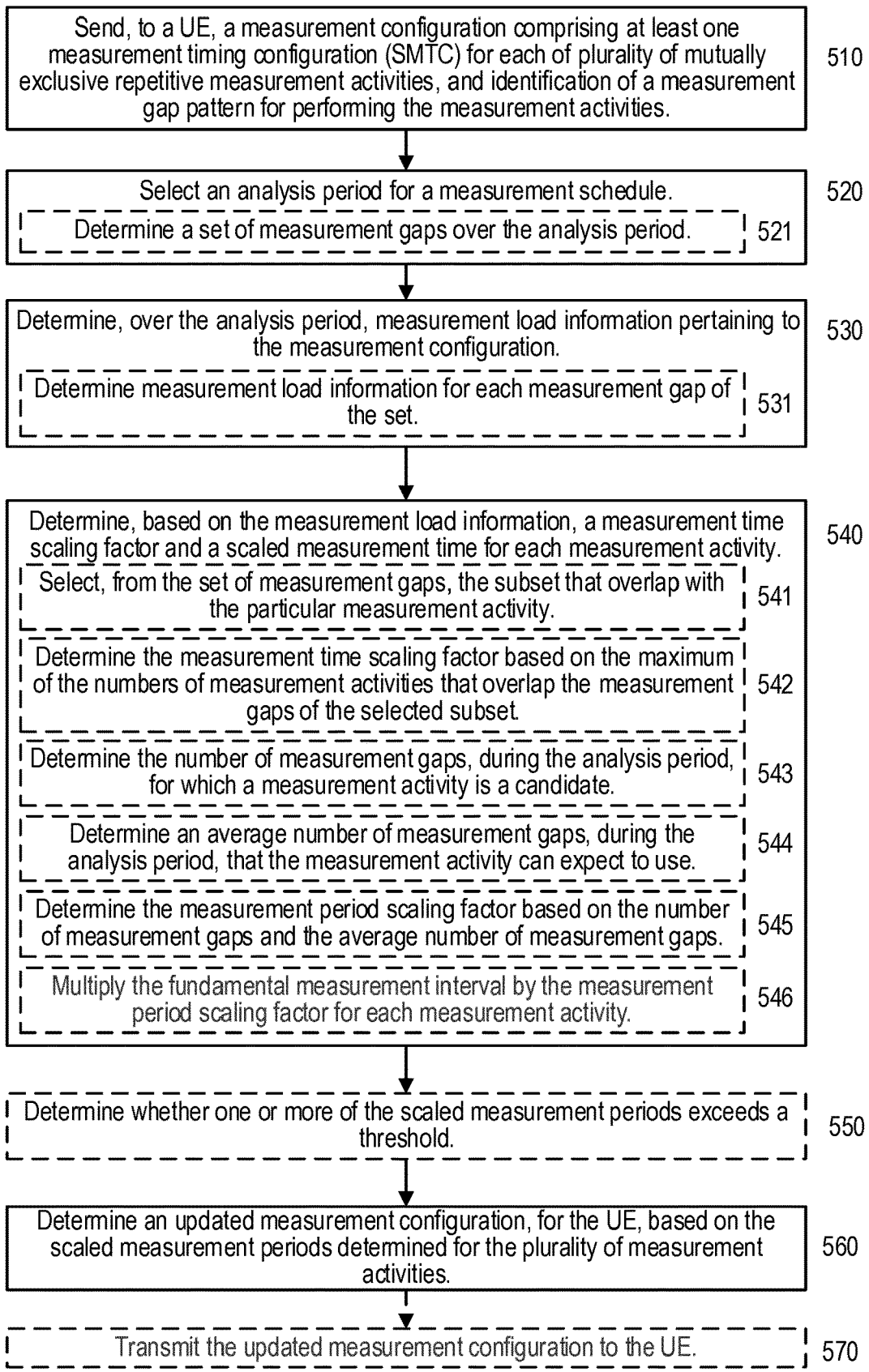
FIG. 5 is a flow diagram of an exemplary method and/or procedure performed by a network node, according to various exemplary embodiments of the present disclosure.

FIG. 5 is a flow diagram of an exemplary method and/or procedure for configuring a user equipment (UE, e.g., wireless device, or component thereof such as a modem) to perform a plurality of mutually-exclusive repetitive measurement activities, according to various exemplary embodiments of the present disclosure. The exemplary method and/or procedure shown in FIG. 5 can be performed by a serving network node (e.g., eNB, gNB, ng-eNB, en-gNB, base station, etc., or component thereof) in communication with a UE in a wireless network, as shown in or described in relation to other figures herein. Furthermore, the exemplary method and/or procedure shown in FIG. 5 can be utilized cooperatively with the exemplary method and/or procedure shown in FIG. 2 to achieve exemplary benefits described herein. Although FIG. 5 shows blocks in a particular order, this order is merely exemplary and the operations shown in FIG. 5 can be performed in a different order than shown in, and can be combined and/or divided into blocks having different functionality. Optional operations are indicated by dashed lines.

In block 510, the network node can transmit, to the UE, a measurement configuration comprising at least one measurement timing configuration (SMTC) for each of a plurality of mutually exclusive repetitive measurement activities (e.g., measurement objects), and identification of a measurement gap pattern for performing the plurality of measurement activities. For example, the network node can transmit the measurement configuration via Radio Resource Control (RRC) signaling to the UE. The plurality of mutually-exclusive repetitive measurement activities can comprise one or more inter-frequency or inter-RAT carriers, with the meaning of "mutually exclusive" as explained above with respect to FIG. 2. Furthermore, measurement activities configured in block 510 can include the same exemplary measurement activities involving one or more of the same signals discussed above with respect to FIG. 2.

In block 520, the network node can select an analysis period for a measurement schedule. For example, the network node can select and/or determine an analysis period (also referred to hereinabove as GURP) using at least the same exemplary techniques as discussed above with respect to FIG. 2.

After selecting the analysis period (e.g., GURP) in block 520, in block 530 the network node can determine, over the analysis period, measurement load information related to the measurement configuration. For example, the network node can determine the measurement load information using at least the same exemplary techniques as discussed above with respect to FIG. 2.

Subsequently, in block 540, the network node can determine, based on the measurement load information, a measurement time scaling factor and a scaled measurement time for each of the plurality of measurement activities. For example, the network node can determine the measurement time scaling factor and the scaled measurement time using at least the same exemplary techniques as discussed above with respect to FIG. 2.

In some embodiments, the network node can determine, in block 550, whether one or more of the scaled measurement times exceeds a threshold. In various embodiments, each scaled measurement time can be associated with a particular threshold, a single threshold can be associated with all scaled measurement times, or a combination of the above approaches can be employed.

In some embodiments, the network node can determine, in block 560, an updated measurement configuration based on the respective scaled measurement times determined, in block 540, for the plurality of measurement activities. In some embodiments, the network node can also transmit, in block 570, the updated measurement configuration to the UE. In some embodiments, the operations of blocks 560 and/or 570 can be performed based on the result of the determination in block 550. For example, if it is determined that one or more of the scaled measurement times exceeds a threshold, the network node can perform various actions to reduce the measurement scaling factor(s) determined in block 540, including but not limited to:

Reducing the transmission periodicity of the measured signals,
Reducing the measurement gap periodicity,
Reducing the measurement periodicity,
Reducing the measurement window (e.g., SMTC or DRS) periodicity,
Reducing the load in measurement gaps (e.g., configure other gaps or ensure some of the measurements can be performed without gaps), and/or
Configuring absolute or relative offsets for the measurements to control whether and how many measurements compete in each gap Any of the above-listed actions can be reflected in the updated measurement configuration determined in block 560 and/or transmitted to the UE in block 570.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 6:
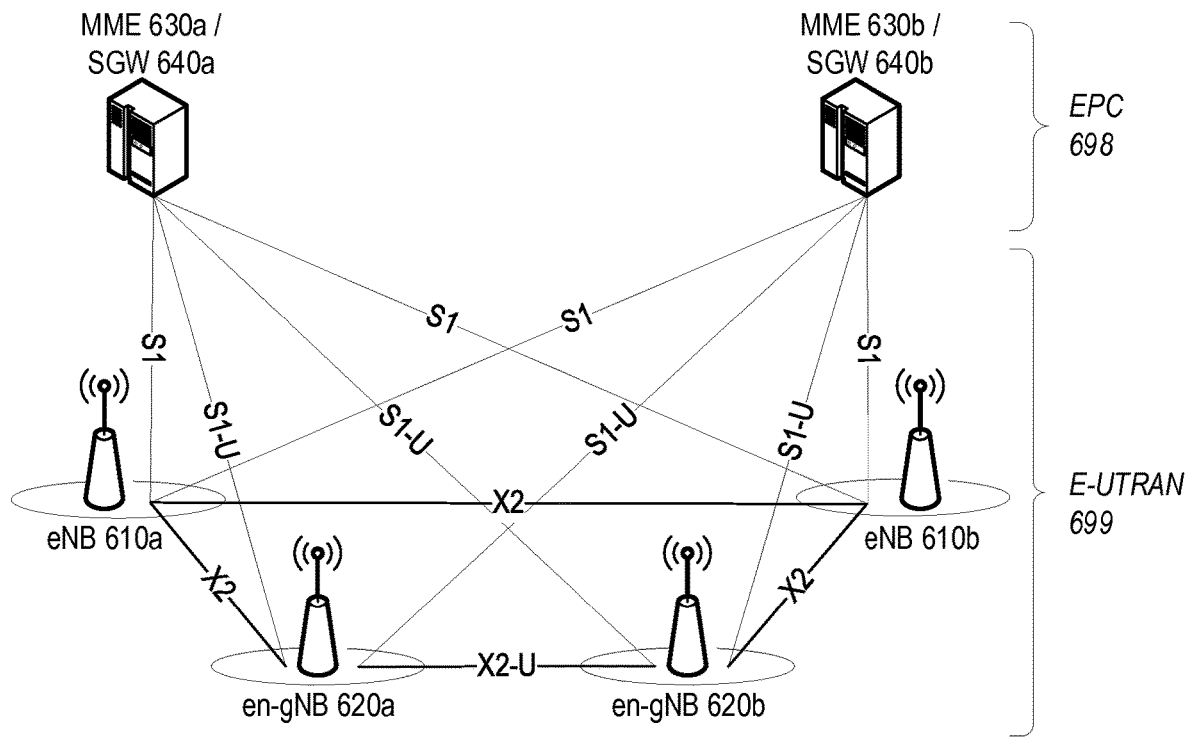
FIG. 6 shows a high-level view of an exemplary LTE network architecture, including a Evolved UTRAN (E-UTRAN) and an Evolved Packet Core (EPC).

FIG. 6 shows a high-level view of an exemplary LTE network architecture, including a Evolved UTRAN (E-UTRAN) 699 and a Evolved Packet Core (EPC) 698. As shown in the figure, E-UTRAN 699 can include eNBs 610 (e.g., 610*a,b*) and en-gNBs 620 (e.g., 620*a,b*) that are interconnected via respective X2 or X2-U interfaces, as the case may be. The eNBs and en-gNBs are also connected via S1 (or S1-U) interfaces to EPC 698. In general, E-UTRAN 699 is responsible for all radio-related functions in the network, including radio bearer control, radio admission control, radio mobility control, scheduling, and dynamic allocation of resources to UEs in uplink and downlink, as well as security of the communications with the UE. These functions reside in the individual radio nodes, such as eNBs 610*a,b* and en-gNBs 620*a,b*.

Collectively, the MME/S-GW handles both the overall control of the UE and data flow between the UE and the rest of the EPC. More specifically, however, the MME processes the signaling protocols between the UE and the EPC, which are known as the Non-Access Stratum (NAS) protocols. On the other hand, the S-GW handles all Internet Procotol (IP) data packets between the UE and the EPC, and serves as the local mobility anchor for the data bearers when the UE moves between individual radio nodes, such as eNBs 610*a,b* and en-gNBs 620*a,b*.

Each of the eNBs 610 can support the LTE radio interface, including frequency division duplexing (FDD), time division duplexing (TDD), or a combination thereof. In contrast, each of en-gNBs 620 supports the NR radio interface but connect to the EPC via the S1-U interface. In addition, the eNBs 610 and en-gNBs 620 can provide multi-RAT (radio access technology) dual connectivity (MR-DC) to UEs as described above, including E-UTRAN/NR Dual Connectivity (EN-DC).

Figure 7:
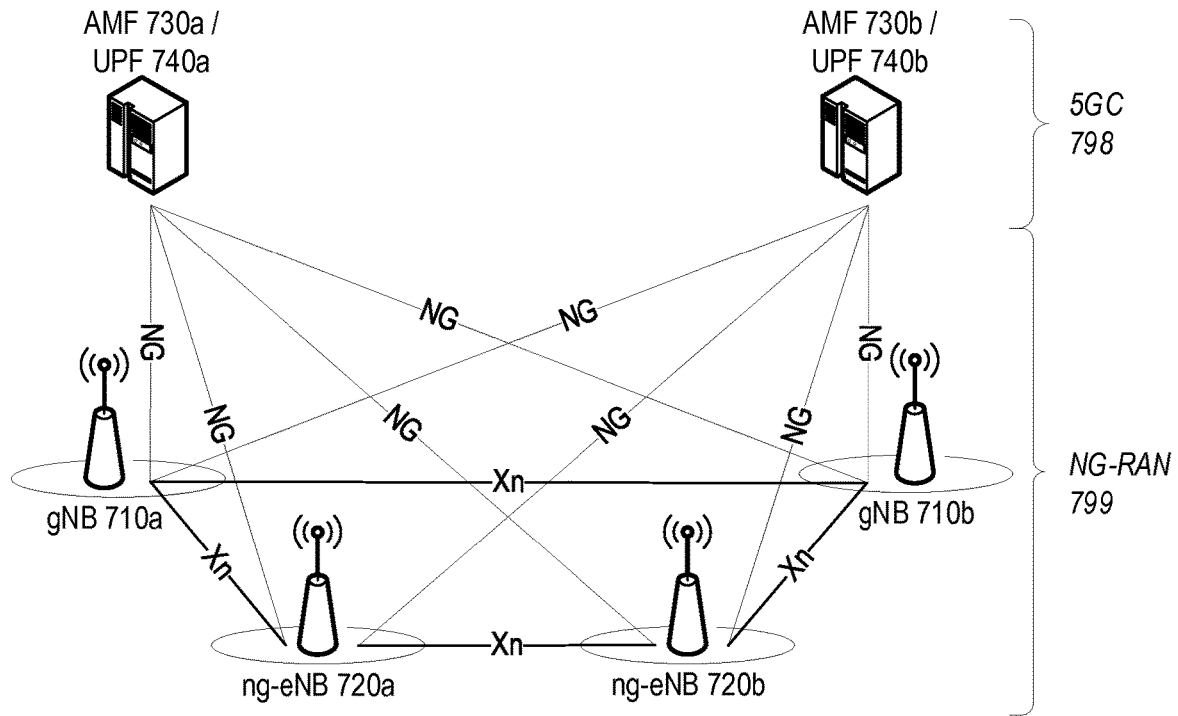
FIG. 7 shows a high-level view of an exemplary 5G network architecture, including a Next Generation Radio Access Network (NG-RAN) and a 5G Core (5GC).

FIG. 7 shows a high-level view of an exemplary 5G network architecture, including a Next Generation Radio Access Network (NG-RAN) 799 and a 5G Core (5GC) 798. As shown in the figure, NG-RAN 799 can include gNBs 710 (e.g., 710*a,b*) and ng-eNBs 720 (e.g., 720*a,b*) that are interconnected with each other via respective Xn interfaces. The gNBs and ng-eNBs are also connected via the NG interfaces to 5GC 798, more specifically to the AMF (Access and Mobility Management Function) 730 (e.g., AMFs 730*a,b*) via respective NG-C interfaces and to the UPF (User Plane Function) 740 (e.g., UPFs 740*a,b*) via respective NG-U interfaces.

NG-RAN 799 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB can be connected to all 5GC nodes within an "AMF Region," which is defined in 3GPP TS 23.501. If security protection for CP and UP data on TNL of NG-RAN interfaces is supported, NDS/IP (3GPP TS 33.401) can be applied.

Each of the gNBs 710a,b can support the NR radio interface, including frequency division duplexing (FDD), time division duplexing (TDD), or a combination thereof. In contrast, each of ng-eNBs 720a,b supports the LTE radio interface but, unlike conventional LTE eNBs (e.g., eNBs 610a,b shown in FIG. 6), connect to the 5GC via the NG interface. In addition, the gNBs 710a,b and ng-eNBs 720a,b can provide multi-RAT (radio access technology) dual connectivity (MR-DC) to UEs as described above, including NG-RAN E-UTRA/NR Dual Connectivity (NGEN-DC).

Each of the gNBs 710a,b can include a central (or centralized) unit (CU or gNB-CU) and one or more distributed (or decentralized) units (DU or gNB-DU). Likewise, each of the en-gNBs 620a,b shown in FIG. 6 can include a CU and one or more DUs. The CUs are logical nodes that host higher-layer protocols and perform various gNB functions such controlling the operation of DUs. Similarly, the DUs are logical nodes that host lower-layer protocols and can include various subsets of the gNB functions, depending on the functional split. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

Figure 8:
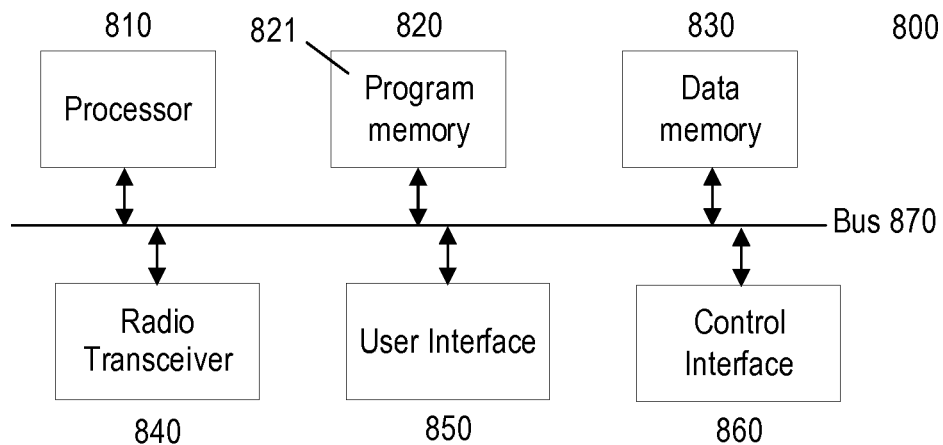
FIG. 8 is a block diagram of an exemplary wireless device or user equipment (UE), according to one or more exemplary embodiments of the present disclosure.

FIG. 8 shows a block diagram of an exemplary wireless device or user equipment (UE) 800 that can be configured according to various exemplary embodiments of the present disclosure, including execution of instructions on a computer-readable medium that correspond to operations of one or more exemplary methods and/or procedures described herein above.

Exemplary device 800 can comprise a processor 810 that can be operably connected to a program memory 820 and/or a data memory 830 via a bus 870 that can comprise parallel address and data buses, serial ports, or other methods and/or structures known to those of ordinary skill in the art. Program memory 820 can store software code, programs, and/or instructions (collectively shown as computer program product 821 in FIG. 8) executed by processor 810 that can configure and/or facilitate device 800 to perform various operations, including operations described below. For example, program memory 820 can store software code or program executed by processor 810 that facilitates, causes and/or programs exemplary device 800 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1xRTT, CDMA2000, 802.11 WiFi, HDMI, USB, Firewire, etc., or any other current or future protocols that can be utilized in conjunction with radio transceiver 840, user interface 850, and/or host interface 860.

As a further example, processor 810 can execute program code stored in program memory 820 that corresponds to MAC, RLC, PDCP, and RRC layer protocols standardized by 3GPP (e.g., for NR and/or LTE). As a further example, processor 810 can execute program code stored in program memory 820 that, together with radio transceiver 840, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 820 can also store software code executed by processor 810 to control the functions of device 800, including configuring and controlling various components such as radio transceiver 840, user interface 850, and/or host interface 860. Program memory 820 can also store one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition or as an alternative, program memory 820 can comprise an external storage arrangement (not shown) remote from device 800, from which the instructions can be downloaded into program memory 820 located within or removably coupled to device 800, so as to enable execution of such instructions.

Data memory 830 can comprise memory area for processor 810 to store variables used in protocols, configuration, control, and other functions of device 800, including operations corresponding to, or comprising, any of the exemplary methods and/or procedures described herein. Moreover, program memory 820 and/or data memory 830 can comprise non-volatile memory (e.g., flash memory), volatile memory (e.g., static or dynamic RAM), or a combination thereof. Furthermore, data memory 830 can comprise a memory slot by which removable memory cards in one or more formats (e.g., SD Card, Memory Stick, Compact Flash, etc.) can be inserted and removed. Persons of ordinary skill in the art will recognize that processor 810 can comprise multiple individual processors (including, e.g., multi-core processors), each of which implements a portion of the functionality described above. In such cases, multiple individual processors can be commonly connected to program memory 820 and data memory 830 or individually connected to multiple individual program memories and or data memories. More generally, persons of ordinary skill in the art will recognize that various protocols and other functions of device 800 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A radio transceiver 840 can comprise radio-frequency transmitter and/or receiver functionality that facilitates the device 800 to communicate with other equipment supporting like wireless communication standards and/or protocols. In some exemplary embodiments, the radio transceiver 840 includes a transmitter and a receiver that enable device 800 to communicate with various 5G/NR networks according to various protocols and/or methods proposed for standardization by 3GPP and/or other standards bodies. For example, such functionality can operate cooperatively with processor 810 to implement a PHY layer based on OFDM, OFDMA, and/or SC-FDMA technologies, such as described herein with respect to other figures. In some exemplary embodiments, the radio transceiver 840 can comprise some or all of the receiver functionality shown in and described above with reference to FIG. 5.

In some exemplary embodiments, the radio transceiver 840 includes an LTE transmitter and receiver that can facilitate the device 800 to communicate with various LTE LTE-Advanced (LTE-A), and/or NR networks according to standards promulgated by 3GPP. In some exemplary embodiments of the present disclosure, the radio transceiver 840 includes circuitry, firmware, etc. necessary for the device 800 to communicate with various 5G/NR, LTE, LTE-A, UMTS, and/or GSM/EDGE networks, also according to 3GPP standards. In some exemplary embodiments of the present disclosure, radio transceiver 840 includes circuitry, firmware, etc. necessary for the device 800 to communicate with various CDMA2000 networks, according to 3GPP2 standards.

In some exemplary embodiments of the present disclosure, the radio transceiver 840 is capable of communicating using radio technologies that operate in unlicensed frequency bands, such as IEEE 802.11 WiFi that operates using frequencies in the regions of 2.4, 5.8, and/or 80 GHz. In some exemplary embodiments of the present disclosure, radio transceiver 840 can comprise a transceiver that is capable of wired communication, such as by using IEEE 802.3 Ethernet technology. The functionality particular to each of these embodiments can be coupled with or controlled by other circuitry in the device 800, such as the processor 810 executing program code stored in program memory 820 in conjunction with, or supported by, data memory 830.

User interface 850 can take various forms depending on the particular embodiment of device 800, or can be absent from device 800 entirely. In some exemplary embodiments, user interface 850 can comprise a microphone, a loudspeaker, slidable buttons, depressable buttons, a display, a touchscreen display, a mechanical or virtual keypad, a mechanical or virtual keyboard, and/or any other user-interface features commonly found on mobile phones. In other embodiments, the device 800 can comprise a tablet computing device including a larger touchscreen display. In such embodiments, one or more of the mechanical features of the user interface 850 can be replaced by comparable or functionally equivalent virtual user interface features (e.g., virtual keypad, virtual buttons, etc.) implemented using the touchscreen display, as familiar to persons of ordinary skill in the art. In other embodiments, the device 800 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 800 having a touch screen display are capable of receiving user inputs, such as inputs related to exemplary methods and/or procedures described herein or otherwise known to persons of ordinary skill in the art.

In some exemplary embodiments of the present disclosure, device 800 can comprise an orientation sensor, which can be used in various ways by features and functions of device 800. For example, the device 800 can use outputs of the orientation sensor to determine when a user has changed the physical orientation of the device 800's touch screen display. An indication signal from the orientation sensor can be available to any application program executing on the device 800, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 860 of the device 800 can take various forms depending on the particular exemplary embodiment of device 800 and of the particular interface requirements of other devices that the device 800 is intended to communicate with and/or control. For example, the control interface 860 can comprise an RS-232 interface, an RS-485 interface, a USB interface, an HDMI interface, a Bluetooth interface, an IEEE 884 ("Firewire") interface, an I$^2$C interface, a PCM-CIA interface, or the like. In some exemplary embodiments of the present disclosure, control interface 860 can comprise an IEEE 802.3 Ethernet interface such as described above. In some exemplary embodiments of the present disclosure, the control interface 860 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 800 can comprise more functionality than is shown in FIG. 8 including, for example, a video and/or still-image camera, microphone, media player and/or recorder, etc. Moreover, radio transceiver 840 can include circuitry necessary to communicate using additional radio-frequency communication standards including Bluetooth, GPS, and/or others. Moreover, the processor 810 can execute software code stored in the program memory 820 to control such additional functionality. For example, directional velocity and/or position estimates output from a GPS receiver can be available to any application program executing on the device 800, including various exemplary methods and/or computer-readable media according to various exemplary embodiments of the present disclosure.

Figure 9:
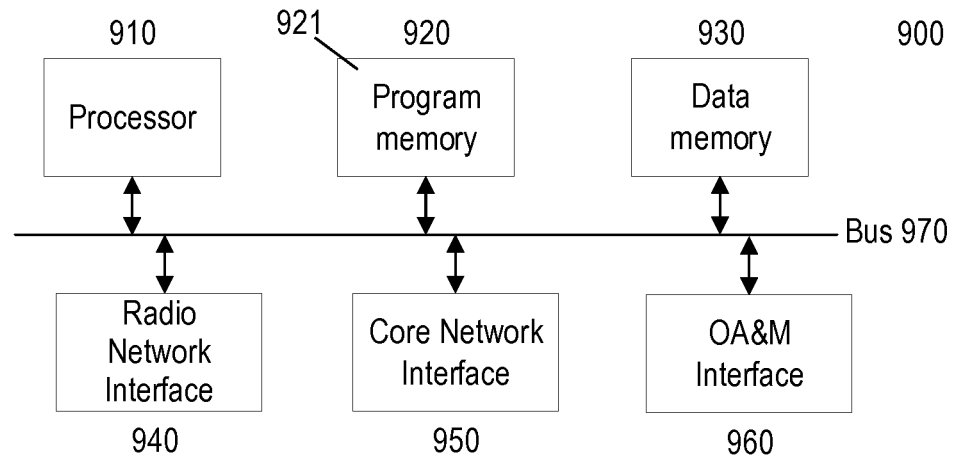
FIG. 9 is a block diagram of an exemplary network node (e.g., a base station, eNB, or gNB), according to various exemplary embodiments of the present disclosure.

FIG. 9 shows a block diagram of an exemplary network node 900 configurable according to various embodiments of the present disclosure, including those described above with reference to other figures. In some exemplary embodiments, network node 900 can comprise a base station, eNB, gNB, or component thereof. Network node 900 comprises processor 910 which is operably connected to program memory 920 and data memory 930 via bus 990, which can comprise parallel address and data buses, serial ports, or other methods and/or structures known to those of ordinary skill in the art. In some exemplary embodiments, processor 910 can comprise some or all of the functionality of processor 500 shown in FIG. 5 and discussed in more detail above.

Program memory 920 can store software code, programs, and/or instructions (collectively shown as computer program product 921 in FIG. 9) executed by processor 910 that can configure and/or facilitate network node 900 to communicate with one or more other devices using protocols according to various embodiments of the present disclosure, including one or more exemplary methods and/or procedures discussed above. Program memory 920 can also comprise software code executed by processor 910 that can facilitate and specifically configure network node 900 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 940 and core network interface 950. By way of example and without limitation, core network interface 950 can comprise the S1 interface and radio network interface 950 can comprise the Uu interface, as standardized by 3GPP. Program memory 920 can further comprise software code executed by processor 910 to control the functions of network node 900, including configuring and controlling various components such as radio network interface 940 and core network interface 950.

Data memory 930 can comprise memory area for processor 910 to store variables used in protocols, configuration, control, and other functions of network node 900. As such, program memory 920 and data memory 930 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 910 can comprise multiple individual processors (not shown), each of which implements a portion of the functionality described above. In such case, multiple individual processors may be commonly connected to program memory 920 and data memory 930 or individually connected to multiple individual program memories and/or data memories. More generally, persons of ordinary skill in the art will recognize that various protocols and other functions of network node 900 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 940 can comprise transmitters, receivers, signal processors, ASICs, antennas, beamforming units, and other circuitry that enables network node 900 to communicate with other equipment such as, in some embodiments, a plurality of compatible user equipment (UE). In some exemplary embodiments, radio network interface can comprise various protocols or protocol layers, such as the PHY, MAC, RLC, PDCP, and RRC layer protocols standardized by 3GPP for LTE, LTE-A, and/or 5G/NR; improvements thereto such as described herein above; or any other higher-layer protocols utilized in conjunction with radio network interface 940. According to further exemplary embodiments of the present disclosure, the radio network interface 940 can comprise a PHY layer based on OFDM, OFDMA, and/or SC-FDMA technologies. In some embodiments, the functionality of such a PHY layer can be provided cooperatively by radio network interface 940 and processor 910 (including program code in memory 920).

Core network interface 950 can comprise transmitters, receivers, and other circuitry that enables network node 900 to communicate with other equipment in a core network such as, in some embodiments, circuit-switched (CS) and/or packet-switched Core (PS) networks. In some embodiments, core network interface 950 can comprise the S1 interface standardized by 3GPP. In some exemplary embodiments, core network interface 950 can comprise one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 950 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 960 can comprise transmitters, receivers, and other circuitry that enables network node 900 to communicate with external networks, computers, databases, and the like for purposes of operations, administration, and maintenance of network node 900 or other network equipment operably connected thereto. Lower layers of OA&M interface 960 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 940, core network interface 950, and OA&M interface 960 may be multiplexed together on a single physical interface, such as the examples listed above.

Figure 10:
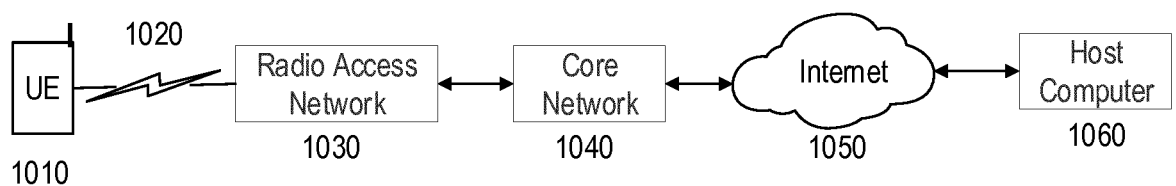
FIG. 10 is a block diagram of an exemplary network configuration usable to provide over-the-top (OTT) data services between a host computer and a user equipment, according to various exemplary embodiments of the present disclosure.

FIG. 10 is a block diagram of an exemplary network configuration usable to provide over-the-top (OTT) data services between a host computer and a user equipment (UE), according to one or more exemplary embodiments of the present disclosure. UE 1010 can communicate with radio access network (RAN) 1030 over radio interface 1020, which can be based on protocols described above including, e.g., LTE, LTE-A, and 5G/NR. RAN 1030 can include one or more network nodes (e.g., base stations, eNBs, gNBs, controllers, etc.). RAN 1030 can further communicate with core network 1040 according to various protocols and interfaces described above. For example, one or more apparatus (e.g., base stations, eNBs, gNBs, etc.) comprising RAN 1030 can communicate to core network 1040 via core network interface 1450 described above. In some exemplary embodiments, RAN 1030 and core network 1040 can be configured and/or arranged as shown in other figures discussed above. Similarly, UE 1010 can also be configured and/or arranged as shown in other figures discussed above.

Core network 1040 can further communicate with an external packet data network, illustrated in FIG. 10 as Internet 1050, according to various protocols and interfaces known to persons of ordinary skill in the art. Many other devices and/or networks can also connect to and communicate via Internet 1050, such as exemplary host computer 1060. In some exemplary embodiments, host computer 1060 can communicate with UE 1010 using Internet 1050, core network 1040, and RAN 1030 as intermediaries. Host computer 1060 can be a server (e.g., an application server) under ownership and/or control of a service provider. Host computer 1060 can be operated by the OTT service provider or by another entity on the service provider's behalf.

For example, host computer 1060 can provide an over-the-top (OTT) packet data service to UE 1010 using facilities of core network 1040 and RAN 1030, which can be unaware of the routing of an outgoing/incoming communication to/from host computer 1060. Similarly, host computer 1060 can be unaware of routing of a transmission from the host computer to the UE, e.g., the routing of the transmission through RAN 1030. Various OTT services can be provided using the exemplary configuration shown in FIG. 10 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 10 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

Exemplary embodiments that selectively scale the respective measurement periods of mutually-exclusive measurement activities for a particular UE, as described herein, can play a critical role by enabling UE 1010 and RAN 1030 to meet the requirements of the particular OTT service between host computer 1060 and UE 1010. Various benefits can result from scaling measurements periods in this manner For example, layer-1 (L1) measurement periods and, consequently, delay until cell identification are reduced, such that suitable cells for handover or offloading can be identified more quickly. One resulting benefit is that handover can be performed before serving cell quality becomes critically low. Another resulting exemplary benefit is that cell offloading can be performed before downlink buffers in the base station overrun. By improving network performance in these and other ways, exemplary embodiments improve data throughput in a coverage area and enable a greater number of users to utilize data-intensive services such as streaming video in various coverage conditions without excessive power consumption or other degradations to user experience, such as dropped data connections caused by delayed handover due to measurement delays.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art.

Example embodiments of the techniques and apparatus described herein include, but are not limited to, the following enumerated examples:

1. A method performed by a user equipment (UE) to schedule a plurality of mutually-exclusive repetitive measurement activities in a wireless network, the method comprising:
   receiving, from a network node serving the UE, a measurement configuration comprising a plurality of mutually exclusive repetitive measurement activities and identification of a measurement gap pattern for performing the plurality of measurement activities;
   selecting an analysis period and determining, over the analysis period, measurement load information related to the measurement configuration;
   determining, based on the measurement load information, a measurement period scaling factor and a scaled measurement period for each of the measurement activities; and
   scheduling measurements comprising the plurality of measurement activities based on at least one of the following derived from the respective scaled measurement periods:
   a schedule and a constraint.

2. The method of embodiment 1, further comprising performing the scheduled measurements comprising the mutually-exclusive measurement activities.

3. The method of any of embodiments 1-2, wherein:
   each of the measurement activities is associated with a set of signals having at least one of a periodicity, a duration, a time offset. and a fundamental measurement interval; and
   the measurement configuration comprises a measurement gap repetition period (MGRP) relating to gaps for performing the measurement activities.

4. The method of embodiment 3, wherein determining a scaled measurement period for a particular measurement activity comprises multiplying the fundamental measurement interval by the measurement period scaling factor for the particular measurement activity.

5. The method of embodiment 3, wherein the analysis period is selected based on a least common multiple (L EM) of the MORP and the respective periodicities associated with the plurality of measurement activities.

6. The method of any of embodiments 1-5, wherein determining the measurement period load information comprises:
   determining a set of measurement gaps over the duration of the analysis period;
   determining, for each particular measurement gap of the set, a number and/or list of measurement activities that overlap the particular gap.

7. The method of embodiment 6, wherein the measurement period scaling factor for a particular measurement activity is determined based the maximum measurement load of all measurements gaps that overlap with the particular measurement activity.

8. The method of embodiment 7, wherein the measurement period scaling factor for a particular measurement activity is further determined based on an average number of measurement gaps, over the analysis period, that the particular measurement activity can expect to use.

9. The method of embodiment 8, wherein the measurement period scaling factor determined for a particular measurement activity is rounded upward to account for potential variations in measurement load for the measurement gaps comprising the analysis period.

10. The method of embodiment 6, wherein the measurement period scaling factors for the plurality of measurement activities is determined jointly based on a function of the measurement period load information relating to the set of measurement gaps and to the plurality of measurement activities.

11. A method performed by a network node, in a wireless communication network, to configure a user equipment (UE) to perform a plurality of mutually-exclusive repetitive measurement activities, the method comprising:
   transmitting, to the UE, a measurement configuration comprising a plurality of mutually exclusive repetitive measurement activities and identification of a measurement gap pattern for performing the plurality of measurement activities;
   selecting an analysis period and determining, over the analysis period, measurement load information related to the measurement configuration;
   determining, based on the measurement load information, a measurement period scaling factor and a scaled measurement period for each of the measurement activities; and
   determining an updated measurement configuration, for the UE, based on the respective scaled measurement periods for the plurality of measurement activities.

12. The method of embodiment 11, further comprising transmitting the updated measurement configuration to the UE.

13. The method of any of embodiments 11-12, wherein:
   each of the measurement activities is associated with a set of signals having at least one of a periodicity, a duration, a time offset and a fundamental measurement interval; and
   the measurement configuration comprises a measurement gap repetition period (MGRP) relating to gaps for performing the measurement activities.

14. The method of embodiment 13, wherein determining a scaled measurement period for a particular measurement activity comprises multiplying the fundamental measurement interval by the measurement period scaling factor for the particular measurement activity.

15. The method of embodiment. 13, wherein the analysis period is selected based on a least common multiple (LCM) of the MGRP and the respective periodicities associated with the plurality of measurement activities.

16. The method of any of embodiments 11-15, wherein determining the measurement period load information comprises:
   determining a set of measurement gaps over the duration of the analysis period;
   determining, for each particular measurement gap of the set, a number and/or list of measurement activities that overlap the particular gap.

17. The method of embodiment 16, wherein the measurement period scaling factor for a particular measurement activity is determined based the maximum measurement load of all measurements gaps that overlap with the particular measurement activity.

18. The method of embodiment 17, wherein the measurement period scaling factor for a particular measurement activity is further determined based on an average number of measurement gaps, over the analysis period, that the particular measurement activity can expect to use.

19. The method of embodiment 18, wherein the measurement period scaling factor determined for a particular measurement activity is rounded upward to account for potential variations in measurement load for the measurement gaps comprising the analysis period.

20. The method of embodiment 21, wherein the measurement period scaling factors for the plurality of measurement activities is determined jointly based on a function of the measurement period load information relating to the set of measurement gaps and to the plurality of measurement activities.

21. The method of any of exemplary embodiments 11-20, wherein the updated measurement configuration comprises at least one of the following:
   reconfiguration of absolute or relative measurement offsets; and
   reduction in at least one of: transmission periodicity of the measured signals, measurement gap periodicity, measurement periodicity, measurement window periodicity, and measurement gap loading.

22. A user equipment (UE) configurable to schedule a plurality of mutually-exclusive repetitive measurement activities in a wireless network, the UE comprising:
   communication circuitry configured for communicating with a network node in the wireless communication network; and
   processing circuitry operatively associated with the communication circuitry and configured to perform operations corresponding to the methods of any of exemplary embodiments 1-10.

23. A network node, in a wireless communication network, arranged to configure a user equipment (UE) to perform a plurality of mutually-exclusive repetitive measurement activities, the network node comprising:
   communication circuitry configured for communicating with the UE; and
   processing circuitry operatively associated with the communication circuitry and configured to perform operations corresponding to the methods of any of exemplary embodiments 11-21.

24. A non-transitory, computer-readable medium storing program instructions that, when executed by at least one processor comprising a user equipment (UE) operating in a wireless network, schedules a plurality of mutually-exclusive repetitive measurement activities according to operations corresponding to any of the methods of embodiments 1-10.

25. A non-transitory, computer-readable medium storing program instructions that, when executed by at least one processor comprising a network node in a wireless communication network, configures a user equipment (UE) to perform a plurality of mutually-exclusive repetitive measurement activities, according to operations corresponding to any of the methods of embodiments 11-21.

The invention clamed is:

1. A method performed by a user equipment (UE) to schedule a plurality of mutually exclusive repetitive measurement activities in a wireless network, the method comprising:

receiving, from a network node serving the UE, a measurement configuration comprising:
  at least one measurement timing configuration (SMTC) for each of a plurality of mutually exclusive repetitive measurement activities that are associated with a respective plurality of sets of signals having respective periodicities; and
  identification of a measurement gap pattern for performing the plurality of measurement activities, wherein the measurement gap pattern includes a measurement gap repetition period (MGRP);
selecting an analysis period for a measurement schedule, based on a maximum or a common multiple of the following: the MGRP, and the plurality of periodicities of the signals associated with the measurement activities;
determining, over the analysis period, measurement load information related to the measurement configuration; and
for each of the measurement activities, determining a measurement time scaling factor and a scaled measurement time based on the measurement load information.

2. The method of claim 1, further comprising:
scheduling measurements comprising the plurality of measurement activities based on at least one of the following derived from the respective scaled measurement times:
  a schedule and a constraint; and
performing the scheduled measurements comprising the plurality of measurement activities.

3. The method of claim 1, wherein:
the plurality of sets of signals also have respective fundamental measurement intervals: and
determining a scaled measurement time for a particular measurement activity comprises multiplying the fundamental measurement interval by the measurement time scaling factor for the particular measurement activity.

4. The method of claim 1, wherein selecting the analysis period is further based on at least one of the following:
a least common multiple of the following: the MGRP, and the plurality of periodicities of the signals associated with the measurement activities; and
a timing reference at the border of system frame number zero in the wireless network.

5. The method of claim 1, wherein:
selecting an analysis periodic comprises determining a set of measurement gaps over the duration of the analysis period; and
for each particular measurement gap of the set, the determined measurement load information comprises one or more of the following:
  a number of measurement activities that overlap the particular measurement gap, or
  a list of measurement activities that overlap the particular measurement gap.

6. The method of claim 5, wherein determining the measurement time scaling factor for a particular measurement activity comprises:
selecting, from the set of measurement gaps, the subset that overlap with the particular measurement activity; and
determining the measurement time scaling factor based on the measurement gap, of the selected subset, having the highest number of other measurement activities competing with the particular measurement activity.

7. The method of claim 5, wherein determining the measurement time scaling factor for a particular measurement activity comprises:
determining the number of measurement gaps, during the analysis period, for which the particular measurement activity is a candidate;
based on the measurement load information, determining an average number of measurement gaps, during the analysis period, that the particular measurement activity can expect to use; and
determining the measurement time scaling factor based on the number of measurement gaps and the average number of measurement gaps.

8. The method of claim 7, wherein at least one of the following applies:
determining the average number of measurement gaps is further based on an on-average fair-sharing policy for the respective measurement gaps; and
the measurement time scaling factor determined for a particular measurement activity is rounded upward to account for potential variations in measurement load for the measurement gaps comprising the analysis period.

9. The method of claim 5, wherein the measurement time scaling factors for the plurality of measurement activities are determined jointly based on a function of the measurement period load information relating to the set of measurement gaps and to the plurality of measurement activities.

10. The method of claim 1, wherein the sealed measurement time comprises one or more of the following: a L1 measurement period, a synchronization signal and PBCH block (SSB) time index determination period, a Primary Synchronization Signal/Secondary Synchronization Signal (PSS/SSS) synchronization time, and a cell identification time.

11. A user equipment (UE) configured to schedule a plurality of mutually exclusive repetitive measurement activities in a wireless network, the UE comprising:
a radio transceiver configured for communicating with a network node in the wireless network; and
processing circuitry operatively associated with the radio transceiver, whereby the processing circuitry and the radio transceiver are configured to perform operations corresponding to the method of claim 1.

12. A non-transitory, computer-readable medium storing computer-executable instructions that, when executed by at least one processor comprising a user equipment (UE) configured for operation in a wireless network, configure the UE to perform operations corresponding to the method of claim 1.

13. A method for a network node, in a wireless communication network, to configure a user equipment (UE) to perform a plurality of mutually exclusive repetitive measurement activities, the method comprising:
transmitting, to the UE, a measurement configuration comprising:
  at least one measurement timing configuration (SMTC) for each of a plurality of mutually exclusive repetitive measurement activities that are associated with a respective plurality of sets of signals having respective periodicities; and
  identification of a measurement gap pattern for performing the plurality of measurement activities, wherein the measurement gap pattern includes a measurement gap repetition period (MGRP);
selecting an analysis period for a measurement schedule, based on a maximum or a common multiple of the following: the MGRP, and the plurality of periodicities of the signals associated with the measurement activities;

determining, over the analysis period, measurement load information related to the measurement configuration;

determining, based on the measurement load information, a measurement time scaling factor and a scaled measurement time for each of the measurement activities; and determining an updated measurement configuration, for the UE, based on the determined scaled measurement times for the plurality of measurement activities.

14. The method of claim 13, wherein:

the method further comprises:
  determining whether one or more of the scaled measurement times exceeds a threshold, and
  transmitting the updated measurement configuration to the UE; and determining, the updated measurement configuration is based on a determination that one or more of the scaled measurement times exceeds the threshold.

15. The method of claim 13, wherein;

the plurality of sets of signals also have respective fundamental measurement intervals; and determining a scaled measurement time for a particular measurement activity comprises multiplying the fundamental measurement interval by the measurement time scaling, factor for the particular measurement activity.

16. The method of claim 13, wherein selecting the analysis period is further based on at least one of the following:

a least common multiple of the following: the MGRP, and the plurality of periodicities of the signals associated with the measurement activities; and a timing reference at the border of system frame number zero in the wireless network.

17. The method of claim 13, wherein:

selecting the analysis periodic comprises determining a set of measurement gaps over the duration of the analysis period; and the determined measurement load information comprises, for each particular measurement gap of the set, one or more of the following:
  a number of measurement activities that overlap the particular measurement gap, or
  a list of measurement activities that overlap the particular measurement gap.

18. The method of claim 17, wherein determining the measurement time scaling factor for a particular measurement activity comprises:

selecting, from the set of measurement gaps, the subset that overlap with the particular measurement activity; and determining the measurement time scaling factor based on the measurement gap, of the selected subset, having the highest number of other measurement activities competing with the particular measurement activity.

19. The method of claim 17, wherein determining the measurement time scaling factor for a particular measurement activity comprises:

determining the number of measurement gaps, during the analysis period, for which the particular measurement activity is a candidate;

determining, based on the measurement load information, an average number of measurement gaps, during the analysis period, that the particular measurement activity can expect to use; and determining the measurement time scaling factor based on the number of measurement gaps and the average number of measurement gaps.

20. The method of claim 19, wherein the measurement time scaling factor determined for a particular measurement activity is rounded upward to account for potential variations in measurement load for the measurement gaps comprising the analysis period.

21. The method of claim 17, wherein the measurement time scaling factors for the plurality of measurement activities are determined jointly based on a function of the measurement period load information relating to the set of measurement gaps and to the plurality of measurement activities.

22. The method of claim 13, wherein the updated measurement configuration comprises at least one of the following:

reconfiguration of absolute or relative measurement offsets; and reduction in at least one of the following: transmission periodicity of the measured signals, measurement gap periodicity, measurement periodicity, measurement window periodicity, and measurement gap loading.

23. The method of claim 13, wherein the scaled measurement time comprises one or more of the following: a L1 measurement period, a synchronization signal and PBCH block (SSB) time index determination period, a Primary Synchronization Signal/Secondary Synchronization Signal (PSS/SSS) synchronization time, and a cell identification time.

24. A network node, in a wireless network, arranged to configure a user equipment (UE) to perform a plurality of mutually exclusive repetitive measurement activities, the network node comprising:

a radio network interface configured to communicate with the UE; and processing circuitry operatively coupled with the radio network interface, whereby the processing circuitry and the radio network interface are configured to perform operations corresponding to the method of claim 13.

25. A non-transitory, computer-readable medium. storing computer-executable instructions that, when executed by at least one processor comprising a network node in a wireless network, configure the network node to perform operations corresponding to the method of claim 13.

* * * * *